US012711958B1

(12) United States Patent
Peña et al.

(10) Patent No.: US 12,711,958 B1
(45) Date of Patent: Aug. 18, 2026

(54) VOICE-ENABLED VIRTUAL WHITEBOARD PERMITTING EXTENDED REALITY (XR) COLLABORATION

(71) Applicant: UIPCO, LLC, San Antonio, TX (US)

(72) Inventors: Ric M. Peña, Boerne, TX (US); Rodney Tyrone Thomas, Cibolo, TX (US); Dustin Bowen Bitter, Lehi, UT (US); Megan Sarah Jennings, San Antonio, TX (US); Paula Ann Whittington, Helotes, TX (US); Nathan Lee Post, Rockport, TX (US); Timothy Blair Chalmers, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 156 days.

(21) Appl. No.: 18/756,475

(22) Filed: Jun. 27, 2024

Related U.S. Application Data

(60) Provisional application No. 63/511,495, filed on Jun. 30, 2023.

(51) Int. Cl.
*G06F 17/28* (2006.01)
*G06T 11/60* (2006.01)
*G10L 15/18* (2013.01)
*G10L 15/22* (2006.01)

(52) U.S. Cl.
CPC .............. *G10L 15/22* (2013.01); *G06T 11/60* (2013.01); *G10L 15/18* (2013.01); *G10L 2015/223* (2013.01)

(58) Field of Classification Search
CPC ... G10L 15/22; G10L 15/18; G10L 2015/223; G06T 11/60; G06F 3/03545; G06F 3/012; G06F 3/017; G06F 40/166; G06F 3/0484; G06F 21/44; H04L 65/4015
USPC ........................................................ 704/257
See application file for complete search history.

(56) References Cited

U.S. PATENT DOCUMENTS 10,503,818 B2 * 12/2019 Satterfield ............ G06F 40/166
11,570,219 B2 * 1/2023 Masi .................. H04L 67/1068
2019/0204907 A1 * 7/2019 Xie ........................ G06F 3/017
2021/0120053 A1 * 4/2021 Shin .................... H04L 67/1068
2023/0315271 A1 * 10/2023 Milne .................... G06F 21/44 715/754
2024/0144587 A1 * 5/2024 Lal ......................... G06F 3/012
2024/0380800 A1 * 11/2024 Bryan .................. G06F 3/0484

* cited by examiner

*Primary Examiner* — Md S Elahee
(74) *Attorney, Agent, or Firm* — Plumsea Law Group, LLC

(57) ABSTRACT

A voice-enabled virtual whiteboard permitting extended reality (XR) collaboration is disclosed. Specifically, the embodiments provide systems and methods that display a virtual whiteboard to various participants who wish to communicate more effectively. The system and method allow participants to provide voice inputs, where the voice inputs are interpreted to add content to the virtual whiteboard. For example, embodiments identify pictures that correspond to the voice inputs and allow the users to add the pictures to add them to the virtual whiteboard. Embodiments may also allow users to edit content to add to the virtual whiteboard privately before providing the virtual whiteboard for public viewing.

17 Claims, 12 Drawing Sheets

VOICE-ENABLED VIRTUAL WHITEBOARD PERMITTING EXTENDED REALITY (XR) COLLABORATION

CROSS-REFERENCE TO RELATED APPLICATION

This application claims the benefit of U.S. Provisional Patent Application Ser. No. 63/511,495 filed on Jun. 30, 2023 and titled "Voice-Enabled Virtual Whiteboard Permitting Extended Reality (XR) Collaboration", the disclosure of which is incorporated by reference herein in its entirety.

TECHNICAL FIELD

The present disclosure generally relates to extended reality (XR) collaboration, and in particular to a voice-enabled virtual whiteboard permitting extended reality (XR) collaboration.

BACKGROUND

Effective collaboration is an important part of conducting a business meeting or allowing a presenter to share information with an audience of attendees. One device that aids in such collaboration is a whiteboard, which provides a surface upon which a speaker may draw as a way of adding visual illustrations as a way to help communicate information to the audience. Furthermore, audience members may also draw on the surface. Thus, such a whiteboard represents a surface that allows collaborating users to draw shapes, text, equations, and so on.

Current whiteboards allow interaction primarily through allowing users to draw on a physical surface (which may be electronic) using a physical pen or stylus. While there may be whiteboards that are electronic, in general, whiteboards are physical entities. Also, because users rely upon a pen or stylus to enter information, these interface elements do not provide the whiteboards with the ability to receive input using other methods, such as voice recognition.

There is a need in the art for a system and method that addresses the shortcomings discussed above.

SUMMARY

In one aspect, a method of communicating using a virtual whiteboard includes displaying the virtual whiteboard to a group of participants. The method further includes receiving a voice input from a particular participant from the group of participants. The method also includes processing the voice input to generate content to add to the virtual whiteboard. The method further includes generating an updated virtual whiteboard by adding the content to the virtual whiteboard. The method also includes displaying the updated virtual whiteboard to the group of participants.

In another aspect, a method of communicating using a virtual whiteboard includes showing the virtual whiteboard privately to a particular participant from a group of participants for private editing. The method further includes receiving a voice input from the particular participant. The method also includes determining a text command corresponding to the voice input, using speech recognition. The method further includes processing the text command to produce generated candidate content to add to the virtual whiteboard. The method also includes updating the virtual whiteboard locally based on a selection of the generated candidate content from the particular participant. The method further includes receiving an indication from the particular participant that the private editing is complete. The method also includes providing the updated virtual whiteboard for public viewing.

In another aspect, a system for communicating using a virtual whiteboard includes at least one processor, configured to show the virtual whiteboard for private editing to a particular participant from a group of participants. The at least one processor is further configured to receive a voice input from the particular participant. The at least one processor is also configured to recognize natural language content corresponding to the voice input. The at least one processor is further configured to process the natural language content to produce generate candidate content to add to the virtual whiteboard. The at least one processor is also configured to update the virtual whiteboard locally based on a selection of the generated candidate content from the particular participant. The at least one processor is further configured to receive an indication that the private editing is complete. The at least one processor is also configured to add the content to the virtual whiteboard for public viewing.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

Figure 1:
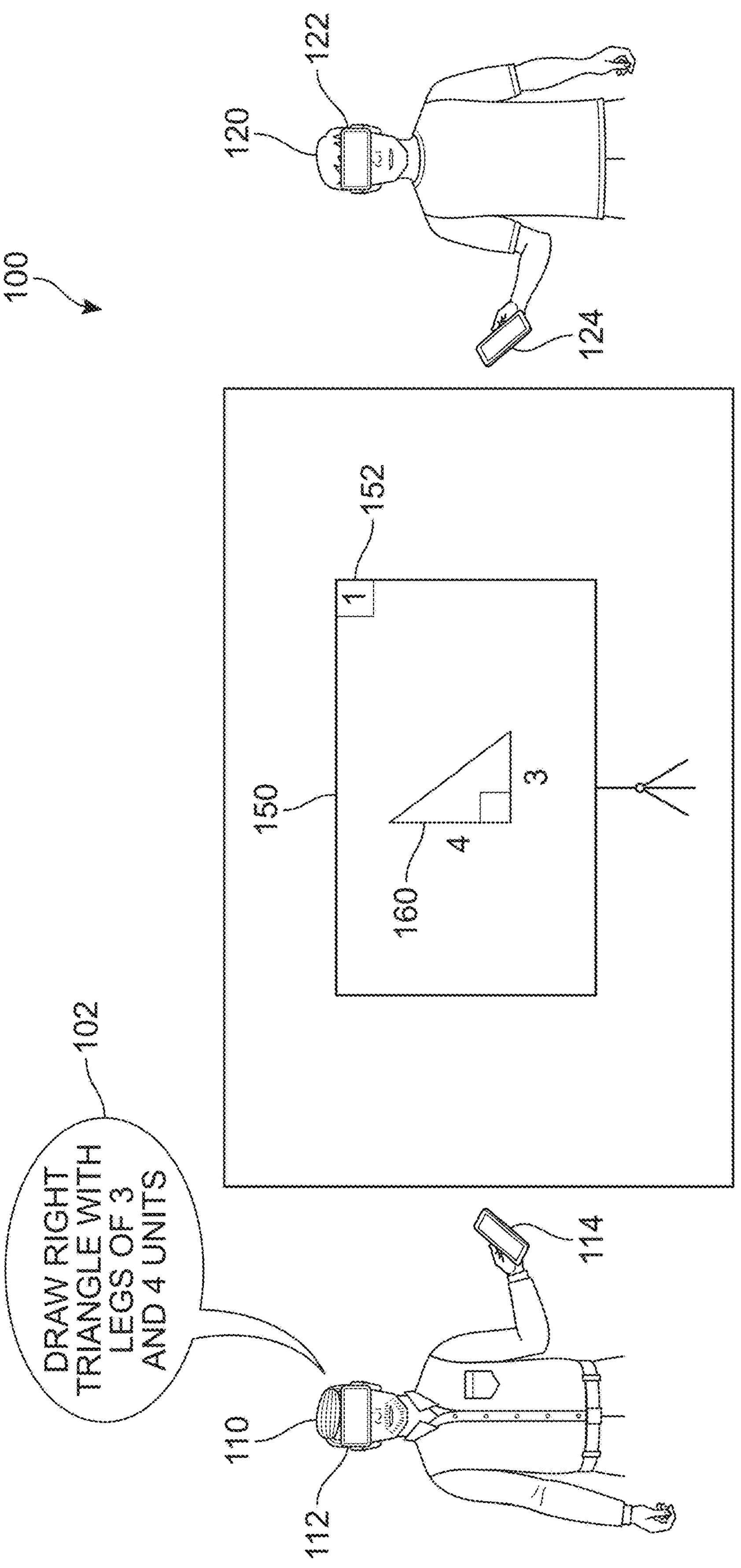
FIG. 1 is a schematic view of a presenter instructing a voice-enabled virtual whiteboard to draw a shape, according to an embodiment.

The embodiments provide systems and methods for collaborating using virtual whiteboards. Specifically, the embodiments provide systems and methods that allow users to add input to a virtual whiteboard. The embodiments may, in particular, allow users to add input to a virtual whiteboard using voice commands. These voice commands may specify text to add to the virtual whiteboard, or a shape to draw on the virtual whiteboard. The voice commands may also refer to a picture to draw on the virtual whiteboard.

For example, the voice commands may serve as a prompt for an image search, a Natural Language Processing (NLP) algorithm, or an Artificial Intelligence (AI) image generation engine. There may also be ways of selecting between multiple candidate images to display when a voice command is somewhat ambiguous. The embodiments also include ways of finalizing virtual whiteboard contents locally, then displaying the content publicly when complete.

The embodiments contemplate using a virtual whiteboard to facilitate collaboration between multiple users. The virtual whiteboard could have multiple virtual layers providing for various drawings and diagrams. Users could point to places on the virtual whiteboard and use a virtual voice assistant like Alexa® or Siri® to explain what they would like to do with respect to the virtual whiteboard. Using such a voice assistant could help compensate for bad handwriting. Alternatively, other technologies could help interpreted the voice commands, as discussed further below. The virtual whiteboard is referred to as a virtual whiteboard because the virtual whiteboard may be shown in an entirely virtual manner, such that everything a user sees with respect to the virtual whiteboard is a virtual whiteboard, in which the user only sees created elements.

Alternatively the virtual whiteboard may include an augmented reality (AR) whiteboard, in which a user sees certain things in the real world, and the AR whiteboard is visible along with a superimposed version of the virtual whiteboard. Both of these alternatives may be referred to as being encompassed by an extended reality (XR) environment or a mixed reality (MR) environment. Such a virtual whiteboard, whether being a VR whiteboard, an AR whiteboard, an XR whiteboard, or a MR whiteboard, will be referred to as a virtual whiteboard throughout for clarity and ease of understanding.

The virtual whiteboard could differentiate between presenters and attendees, and different pens/markers/styluses could be associated with different permissions and access privileges. Attendees could have a copy of the virtual whiteboard in front of them and the presenter could step in to interact with the attendees, such as when attendees attempt to solve an equation. The system could also use voice recognition to identify a participant, use gesture input, and provide for real-time translation.

Current whiteboards allow interaction primarily through allowing users to draw on a physical surface (which may have electronic properties) using a physical pen or stylus. The embodiments provide for a virtual whiteboard (which may correspond to a stack of layered whiteboard surfaces/layers). Moreover, the virtual whiteboard surfaces/layers allow the users to interact with the virtual whiteboard not only through a pen or stylus, but also by using voice interaction.

Thus, the system is capable of voice recognition to identify what a user would like to draw on the virtual whiteboard (voice recognition captures the user instruction as text, and then a search engine, Natural Language Processing (NLP), or other Artificial Intelligence (AI) interprets the identified command to draw accordingly). The virtual whiteboard also facilitates interaction between a presenter and attendees, where the presenter may interact with the attendees to teach a lesson, such as solving a math problem, or posing a question and interacting with the attendees to solve the question.

FIG. 1 is a schematic view 100 of a presenter instructing a voice-enabled virtual whiteboard to draw a shape, according to an embodiment. For example, FIG. 1 shows a presenter 110 and an attendee 120. The presenter 110 wears an extended reality (XR) headset 112 and holds a mobile device 114. The attendee 120 also wears an extended reality (XR) headset 122 and holds a mobile device 124. Thus, the embodiments provide improved ways for users to interact in an extended reality (XR) environment. Details of the XR headset 112 and XR headset 122 are provided below.

Extended reality (XR) may refer to a number of related technologies. XR is an emerging umbrella term for immersive technologies that place a user directly into a computer-generated environment. For example, XR includes augmented reality (AR), virtual reality (VR), and mixed reality (MR) plus those that are still to be created. All of these immersive technologies extend the reality individuals experience by either blending the virtual and real worlds or by creating a fully immersive experience.

In augmented reality (AR), virtual information and objects are overlaid on the real world. This experience enhances the real world with digital details such as images, text, and animation. Augmented reality is accessed through AR glasses or via displays such as screens, tablets, and smartphones. In AR, the glasses displays overlaid digital elements while also showing the real environment. This means users are still able to interact with their environment. Examples of AR are games that overlay digital creatures onto the real world.

In a virtual reality (VR) experience, users are fully immersed in a simulated digital environment. Users wear a VR headset or head-mounted display to get a fully immersive view of an artificial world that fools their brain into believing they are interacting directly with whatever new world the VR developers created. VR may be a valuable technology in that users can experience and interact with a simulated environment which would be difficult to create in the real world.

In mixed reality (MR), also referred to as hybrid reality, digital and real-world objects co-exist and can interact with one another in real-time. Mixed reality requires an MR headset and more processing power than VR or AR. MR allows a user to place digital objects into the room the user is standing in and gives the user the ability to spin it around or interact with the digital object in any way possible. By permitting greater interaction, MR may have greater value in various scenarios, such as where manipulating generated objects is useful.

As depicted in FIG. 1, an XR headset 112 allows a first user 110 to view a displayed image or a see-through view of the scene in front of the first user 110. For example, first user 110 may be a presenter at a business meeting. Alternatively, first user 110 may have the role of a teacher or instructor in an educational setting. However, first user 110 may also just be a participant in a group discussion. In such a situation, second user 120 may have the role of a student in the educational setting. While FIG. 1 presents an XR headset 112 as comprising a VR headset 112, other embodiments may include an AR headset, an MR headset, or another wearable computing device such as a pair of smart glasses, a smart helmet, a smart visor, a smart face-shield, smart contact lenses, or another head-mounted display device in lieu of VR headset 112.

In some cases, there is an XR headset 112. The XR headset 112 system may be configured to present a combined image that includes both a displayed (virtual) image and a see-through view of the physical environment or real-world scene in front of the first user 110, where the displayed image is overlaid on the see-through view.

In different operational modes, an XR headset 112 may present the displayed image so that the area of the displayed image is transparent, semitransparent or opaque. In other words, when operating in a transparent mode, the see-through view of the real-world scene is unblocked. An overlaid displayed image may be provided with low contrast. Similarly, when operating in the semitransparent mode, the see-through view of the real-world scene is partially blocked. An overlaid displayed image can be provided with higher contrast. Finally, when operating in the opaque mode, the see-through view of the real-world scene is fully blocked. An overlaid displayed image can be provided with high contrast.

As will be discussed further below, in different embodiments, some XR headsets 112 can also provide a see-through display for an augmented reality (AR) view. In such a display configuration, real-world scenes are visible to the first user 110. However, additional image information is overlaid on the real-world scenes. In one embodiment, there may be more than one area in which the display of images over the real-world view occurs. Thus, a displayed image may be viewed by the first user 110 at the same time that a view of the scene from the surrounding environment may be viewed. The displayed image (virtual projection) and the real-world view may be viewed as a combined image where the displayed virtual image is overlaid on the see-through view.

In most cases, the XR headset 112 system includes a wearable frame with lenses that have display areas and clear areas. The XR headset 112 system may also have image sources and associated optics to present image light from the image source to the display areas. When worn, the frame is supported on the user's head with frame arms ("arms"). In some embodiments, the arms may contain electronics such as a processor to drive the displays and peripheral electronics such as batteries and wireless connection(s) to other information sources (for example, through Wi-Fi, Bluetooth, cellular or other wireless technologies). One or more cameras may be included to capture images of the surrounding environment.

The locations of the various components in the XR headset 112 system may vary in different embodiments. The lens may also include controllable darkening layers in the display areas configured to change the opacity behind the respective portions of the display area, thereby enabling changes in operating mode between transparent, semi-transparent and opaque in the areas where images are displayed. An XR headset 112 may provide image information to one eye of the first user 110 or both eyes of the first user 110. If image information is provided to both eyes of the first user 110, the image information may be adapted to each eye to provide stereoscopic three-dimensional (3D) effects.

A wide variety of XR headset 112 systems and image sources to provide images for display are known in the art including organic light-emitting diode (OLED) displays, quantum dot based light emitting diodes (QLED) displays, liquid crystal displays (LCDs), or liquid crystal on silicon (LCOS) displays, among others. In addition, the image sources may be microprojectors or microdisplays with associated optics to present the image light to the display areas for viewing by human eyes. In different embodiments, the optics associated with the image sources relay the image light from the image sources to the display areas, and can include refractive lenses, reflective lenses, mirrors, diffractive lenses, and/or holographic lenses or waveguides.

As noted above, in some embodiments, the XR headset 112 may be semitransparent, thereby enabling the user to view the real-world scene beyond the display, with projected images appearing superimposed or overlaid upon the background scene. Thus, the first user 110 may view a scene through a partially transparent XR headset 112 where real world objects, like a desk, a table and walls, are partially visible through the XR headset 112 which also places virtual objects within the visible scene. The virtual object(s) may be anchored to the touchscreen surface. This approach provides the first user 110 with an augmented reality experience in which the first user 110 can see the "real world" through the display while simultaneously viewing virtual objects that appear to be fixed in real locations or on real surfaces.

In the remaining discussion of FIG. 1, first user 110 will be referred to as presenter 110 because FIG. 1 characterizes the role of first user 110 as that of a presenter 110. In FIG. 1, the presenter 110 says, "Draw Right Triangle with Legs of 3 and 4 Units" as verbal instruction 102. In response, the system uses voice recognition and Natural Language Processing (NLP) to discern that the presenter 110 would like to draw a picture. For example, by recognizing "Draw," the system may understand that the remainder of the phrase 102 is an instruction explaining what to draw on the virtual whiteboard. For example, the presenter 110 could enter the verbal command into a microphone integrated into the XR headset 112 or a microphone integrated into the mobile device 114.

The system further processes the instruction using NLP, such as by using a language model (which may be an appropriate large language model), to understand the user's intent. Based on the processing and recognition, the system infers in this example that the presenter 110 would like to draw a right triangle 160 on the virtual whiteboard 150. The system further infers that the right triangle 160 should have legs of 3 and 4 units, respectively. While the user does not specify these settings explicitly, the drawing 160 on the virtual whiteboard 150 may have certain defaults to use for the drawn shape. For example, the drawn right triangle 160 may default to solid black sides for the triangle as well as a solid white fill pattern for the interior of the triangle.

Thus, presenter 110 and attendee 120 each see through their respective XR headsets 112 and 122 a view of virtual whiteboard 150. The view of virtual whiteboard 150 presented in FIG. 1 shows a first layer 152 of the virtual whiteboard 150. For example, the first layer 152 shows a right triangle 160, as requested by presenter 110. Because it is meant to show a right triangle, the first layer 152 shows the right triangle 160 as having an indicator that the right angle is in fact a right angle. Thus, both the presenter 110 and the attendee 120 are able to see the virtual whiteboard 150, and refer to the right triangle 160.

Figure 2:
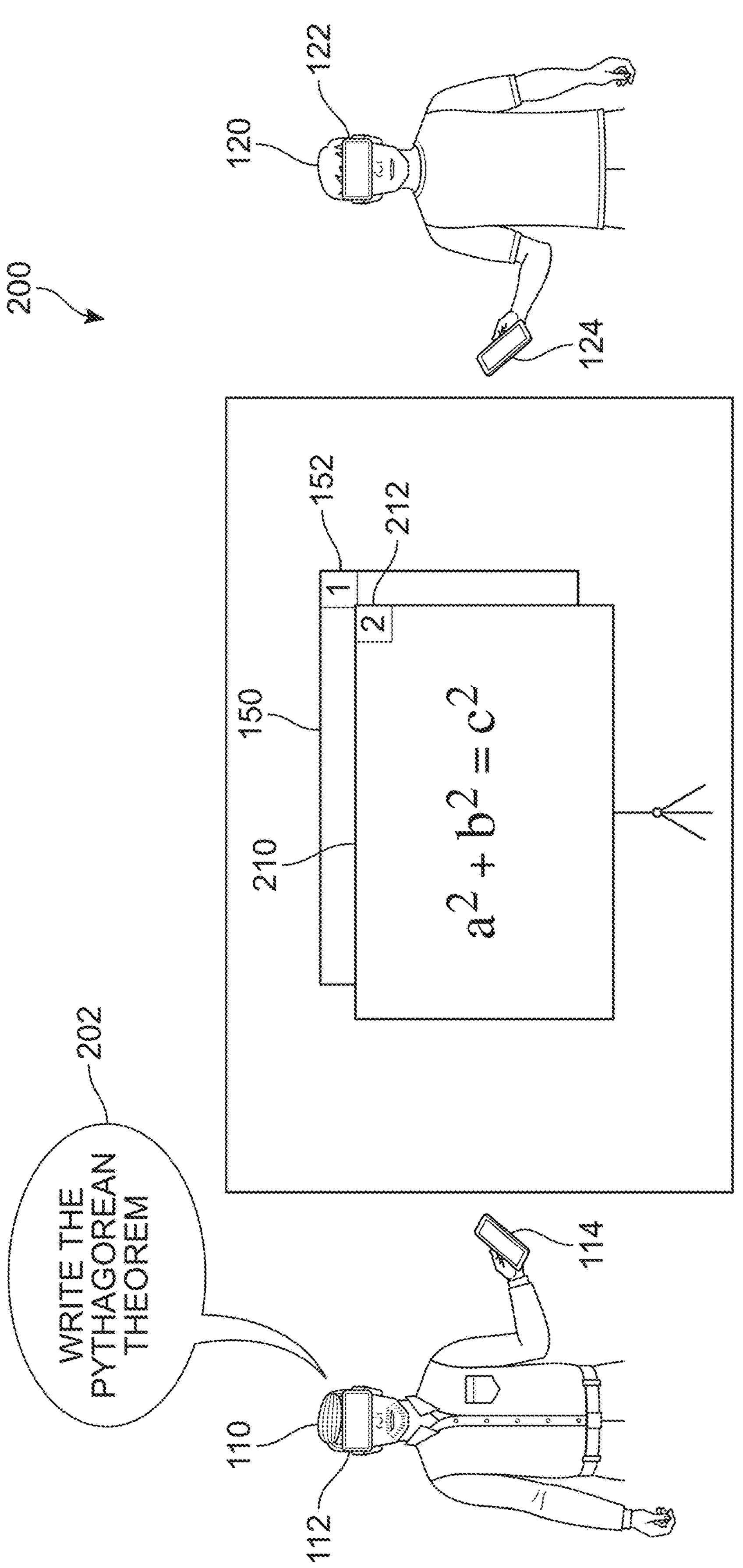
FIG. 2 is a schematic view of a presenter instructing a voice-enabled virtual whiteboard to display text, according to an embodiment.

FIG. 2 is a schematic view 200 of a presenter instructing a voice-enabled virtual whiteboard to display text, according to an embodiment. FIG. 2 again shows a presenter 110 with an XR headset 112 and a mobile device 114, as well as an attendee 120 with an XR headset 122 and a mobile device 124. FIG. 2 shows a next stage of interaction between the presenter 110 and the attendee 120.

For example, the presenter 110 may say, "Write the Pythagorean Theorem" as verbal instruction 202. In response, the system recognizes that the presenter 110 wishes to write "$a^2+b^2=c^2$." As discussed further, later, the system may have in place certain configuration options that allow the system to understand that the instruction 202 indicates the presenter 110 wishes to write the formula "$a^2+b^2=c^2$" rather than writing explicitly "The Pythagorean Theorem."

For example, the virtual whiteboard 150 may include two layers, a first layer 152 and a second layer 212. Each layer may include its own separate content. For example, the first layer 152 may include the right triangle 160 as shown in FIG. 1. The second layer 212 may include different content. In particular, the second layer 212 may include the actual text of the Pythagorean Theorem. Thus, the second layer 212 shows "$a^2+b^2=c^2$" 210 as text that presents the Pythagorean Theorem.

When writing text such on the virtual whiteboard 150, the virtual whiteboard 150 may default to text of a particular font and font size. However, these settings may also be controllable by a user. For example, if a presenter 110 or an attendee 120 has trouble reading the text, the presenter 110 or the attendee 120 may issue a request to increase the size of the text. Additionally, the presenter 110 and the attendee 120 may switch back and forth between the first layer 152 and the second layer 212 or otherwise reorder the layers. Such switching may use gestures.

For example, the presenter 110 may use mobile device 114 or the attendee 120 may use mobile device 124 to change which layer is the layer on top or otherwise reorder the layers. FIG. 2 shows second layer 212 and first layer 152 as a stack of layers, where one layer is on top and is visible. It is also possible to have an embodiment where layers are spread across a virtual environment in various place. In such an embodiment, multiple layers are displayed and interacted with concurrently. For example, both the first layer 152 and the second layer 212 may be presented next to one another, such as horizontally or vertically.

Figure 3:
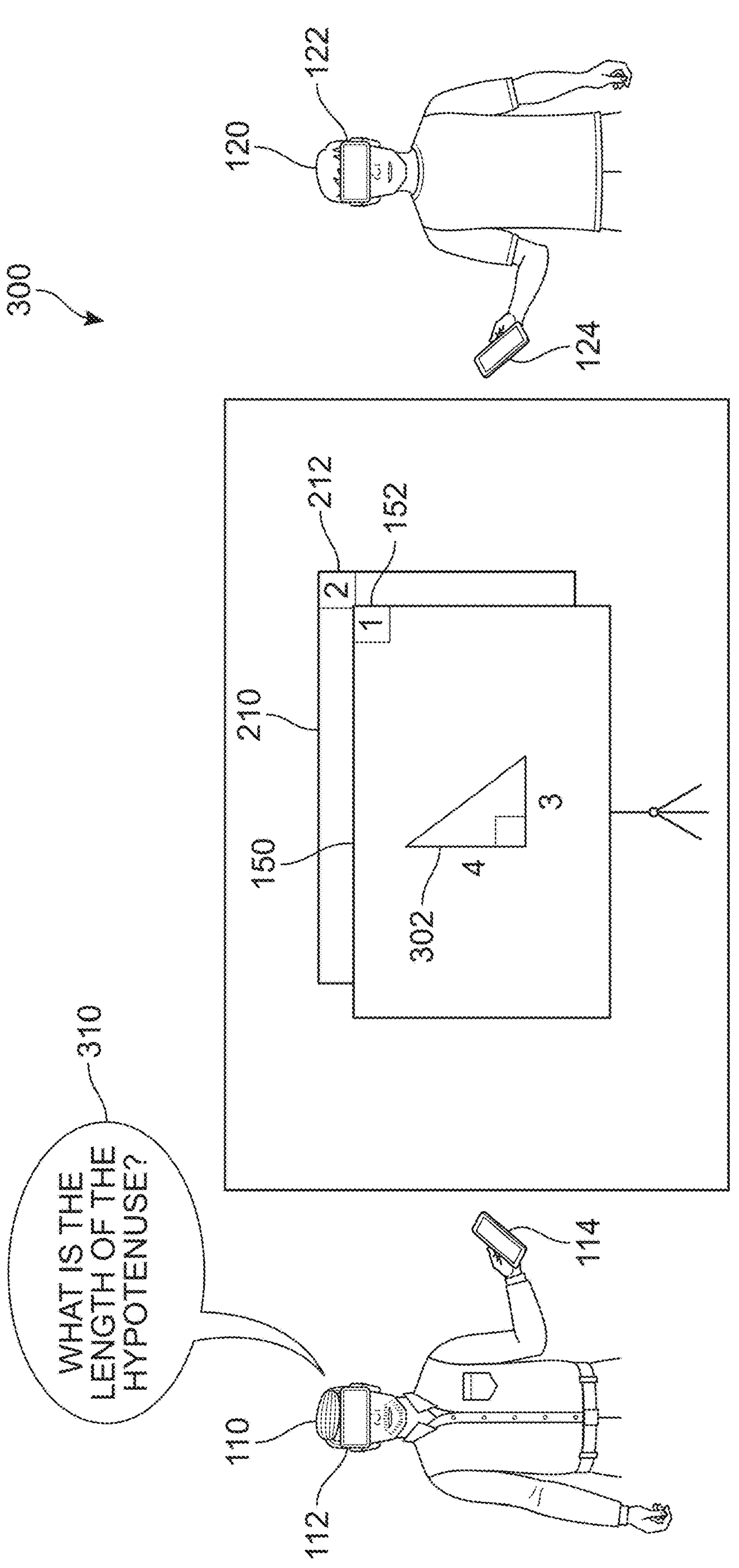
FIG. 3 is a schematic view of a presenter asking an attendee to answer a question, according to an embodiment.

FIG. 3 is a schematic view 300 of a presenter asking an attendee to answer a question, according to an embodiment. FIG. 3 again shows a presenter 110 with an XR headset 112 and a mobile device 114, as well as an attendee 120 with an XR headset 122 and a mobile device 124. In FIG. 3, the presenter 110 asks the attendee 120 the question 310 "What is the Length of the Hypotenuse?" FIG. 3 shows that virtual whiteboard 150 now has first layer 152 on top of second layer 210.

Because the presenter 110 refers to the hypotenuse, the system is able to use Natural Language Processing (NLP) to recognize that the goal of the interaction is to prompt the attendee 120 to use the Pythagorean Theorem to identify the length of the hypotenuse of right triangle 150. Thus, FIG. 3 shows right triangle 312 as having an "x" next to the hypotenuse of the right triangle 312. This interaction creates a scenario in which the attendee 120 is able to answer the question 310 posed by presenter 110. For example, the attendee 120 may plug in "3" as "a" and plug in "4" as "b". Using the Pythagorean Theorem, the equation provides $3^2+4^2=25$. Because 25 is the square of the length of the hypotenuse, the length of the hypotenuse is 5 (the square root of 25).

The attendee 120 may provide this answer by saying the number out load, or may enter the answer using the mobile device 124, as non-limiting examples. Once the correct answer is entered, the right triangle 312 may be updated according and the "x" may be replaced by "5." If the attendee 120 provides an incorrect answer, the system may indicate that the answer is incorrect. The system may also provide hints to the attendee 120 to help the attendee 120 understand how to answer the question correctly.

Figure 4:
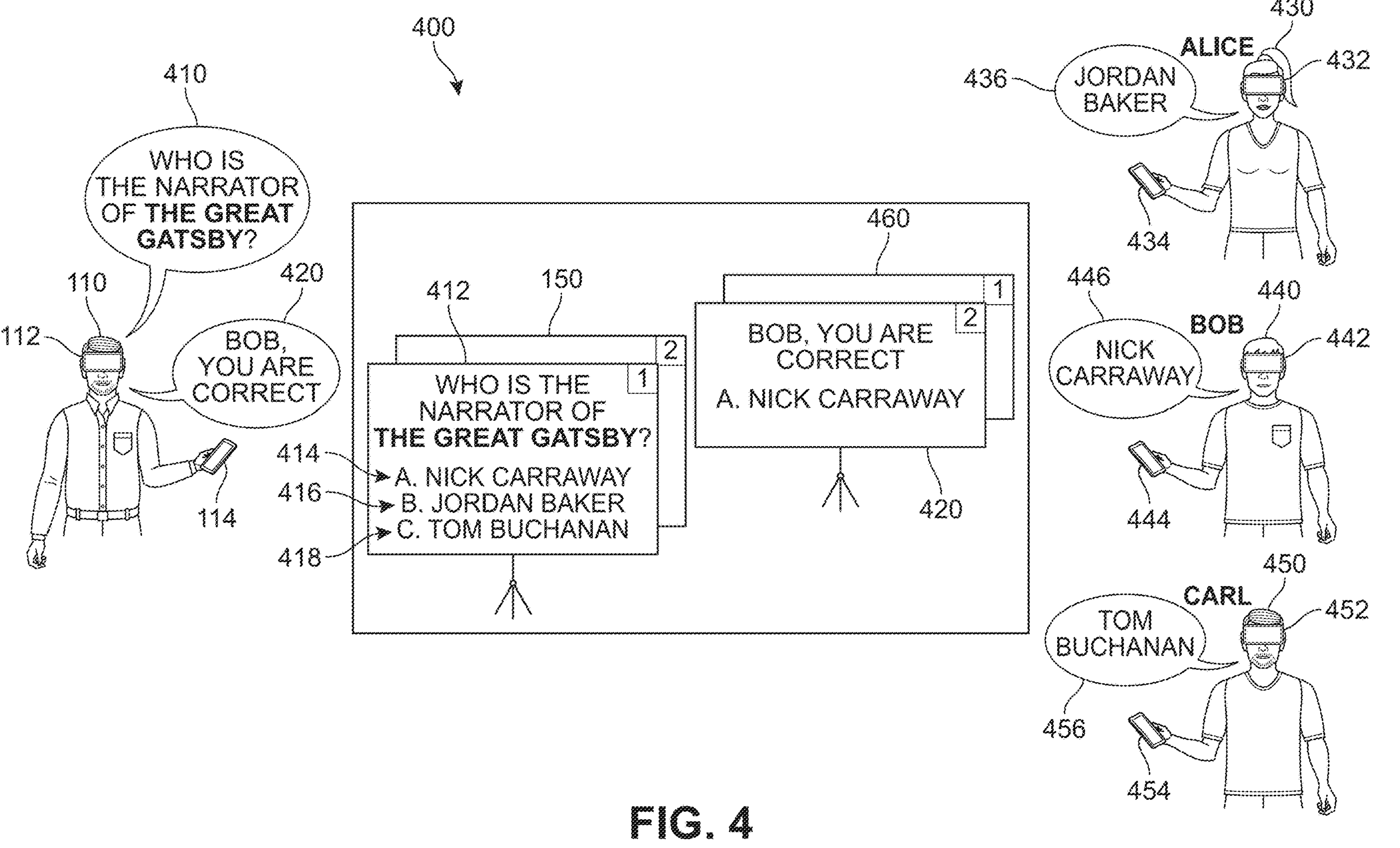
FIG. 4 is a schematic view of a presenter asking a group of attendees to answer a multiple-choice question, according to an embodiment.

FIG. 4 is a schematic view 400 of a presenter asking a group of attendees to answer a multiple-choice question, according to an embodiment. FIG. 4 again shows a presenter 110 with an XR headset 112 and a mobile device 114. For example, there may also be three attendees, attendee 1 (Alice) 430, attendee 2 (Bob) 440, and attendee 3 (Carl) 450. For example, attendee 1 (Alice) 430 may have an XR headset 432 and a mobile device 434, attendee 2 (Bob) 440 may have an XR headset 442 and a mobile device 444, and attendee 3 (Carl) 450 may have an XR headset 452 and a mobile device 454.

In FIG. 4, the presenter 110 may wish to interact with attendee 1 (Alice) 430, attendee 2 (Bob) 440, and attendee 3 (Carl) 450 to teach them about American literature. For example, the presenter 110 could pose the question 410 "Who is the Narrator of The Great Gatsby?" on virtual whiteboard 150. For example, FIG. 4 shows a first layer of the virtual whiteboard 150 with the question 412 "Who is the Narrator of the Great Gatsby?" shown to correspond to the spoken question. Such a spoken question may be recognized using speech recognition techniques.

The question may be one of a plurality of pre-existing questions. Accordingly, the presenter 110 says the question so that the system is able to identify the corresponding pre-existing question as attendee 1 (Alice) 430, attendee 2 (Bob) 440, and attendee 3 (Carl) 450 each hear the question. However, an alternative approach is that the presenter 110 selects the question using mobile device 114. Then, the virtual whiteboard 150 looks up the question for display. The virtual whiteboard 150 could also use text-to-speech technologies to pose the questions to the attendees if the presenter 110 does not want to recite the question orally.

For example, the virtual whiteboard 150 may only show the question 412 "Who is the Narrator of The Great Gatsby?" presented as an open-ended question. However, it is also possible to present the question as a multiple-choice question. For example, the suggested answers may be answer 414 "A. Nick Carraway", answer 416 "B. Jordan Baker", and answer 418 "C. Tom Buchanan." These suggested answers may be chosen so that while only one answer is correct, the other answers are plausible answers.

For example, while the actual narrator of The Great Gatsby is "Nick Carraway," corresponding to answer 414, Jordan Baker and Tom Buchanan are also plausible answers as they are also each major characters in The Great Gatsby. If the other answers are not plausible answers, the question may be excessively easy and may lack educational value. For example, if the question is, "What is the fourth planet from the Sun?" and the suggested answers are "A. Pastrami," "B. Mars," and "C. Salamander," these answers may be too suggestive of the correct answer of "Mars," in that "Pastrami" and "Salamander" have no clear relationship to planets.

In FIG. 4, once the presenter 110 has posed the question 412 to attendee 1 (Alice) 430, attendee 2 (Bob) 440, and attendee 3 (Carl) 450, and optionally provided answers 414, 416, and 418, the attendees have a chance to answer the question 412. For example, each attendee could say his or her answer to the question 412. Attendee 1 (Alice) 430 says "Jordan Baker" as her answer 436. Attendee 2 (Bob) 440 says "Nick Carraway" as his answer 446. Attendee 3 (Alice) 450 says "Tom Buchanan" as his answer 456.

Thus, of the three attendees, Attendee 2 (Bob) 440 has answered the question 412 correctly. The secondary virtual whiteboard 460 indicates "Bob, you are correct. A. Nick Carraway" as feedback 420 on the virtual whiteboard 460. FIG. 4 shows the feedback 420 presented as a separate layer. FIG. 4 shows two virtual whiteboards, virtual whiteboard 150 and secondary virtual whiteboard 460 displayed simultaneously. Virtual whiteboard 150 shows the layer presenting the question 412 and the relevant answers 414, 416, and 418. Secondary virtual whiteboard 460 shows feedback based on the attendees' answers. FIG. 4 shows an example in which only one attendee answers correctly. in other examples multiple attendees may answer correctly or no attendees may answer correctly. If multiple attendees answer correctly, each attendee may be acknowledged. If no attendee answers correctly, the presenter 110 may pose the question 410 again. The presenter 110 may provide the attendees with hints or coaching to help the attendees correctly answer the question 410.

Some embodiments may include provisions for displaying a virtual whiteboard in a virtual reality (VR) environment, an augmented reality (AR) environment, or an extended reality (XR) environment. In some embodiments, the environment allows participants in a communications process to use the virtual whiteboard to effectively share information. In some cases, the virtual whiteboard provides various ways to allow the participants to edit and interact with the shared virtual whiteboard. In some embodiments, the participants may interact with the shared virtual whiteboard by uttering voice commands. Such voice commands may be received by a microphone, such as a microphone built into an XR headset of a participant, a microphone built into a mobile device of a participant, or a microphone present in an environment of a participant. In some cases, voice commands are processed using speech recognition.

In some embodiments, such speech recognition identifies voice commands as being commands to display text on the virtual whiteboard. When displaying such text, there may be predefined default parameters, such as font and size for the text to be displayed. In some cases, the speech recognizes the commands as being commands to display predefined shapes on the virtual whiteboard.

The shapes may be simple shapes such as polygons or may be more complicated shapes. When drawing such shapes, there may be predefined default parameters such as line thicknesses, fill styles, coloration, and so on. It will be recognized that such default parameters for displaying text or shapes may be overridden by users in various ways, such as by a command presented by the user, which may be a voice command or a command provided using another interface mechanism.

In some cases, the voice instruction is processed as an instruction to draw a picture. Such an instruction may lead to various actions to identify a corresponding picture to add to the virtual whiteboard. In some embodiments, the instruction identifies a single candidate picture with a high confidence. Such a candidate picture with a high confidence may be automatically used. Alternatively, the candidate picture with the high confidence may be confirmed with a user. In some cases, there is no appropriate single candidate picture and the user is shown multiple candidate pictures. The user may select an appropriate picture from among the candidate pictures.

In some embodiments, the participants use other forms of input besides voice inputs. In some cases, the participants may use a touchscreen of a mobile device. In some embodiments, the touchscreen allows input using an instrument. The instrument may be a stylus, a pen, or a fingertip. In some cases, the participants may use a gesture to input content for the virtual whiteboard. If a gesture is used to input content for the virtual whiteboard, the gesture may be detected with a motion sensor. The gesture may also be detected using a touchscreen.

Figure 5:
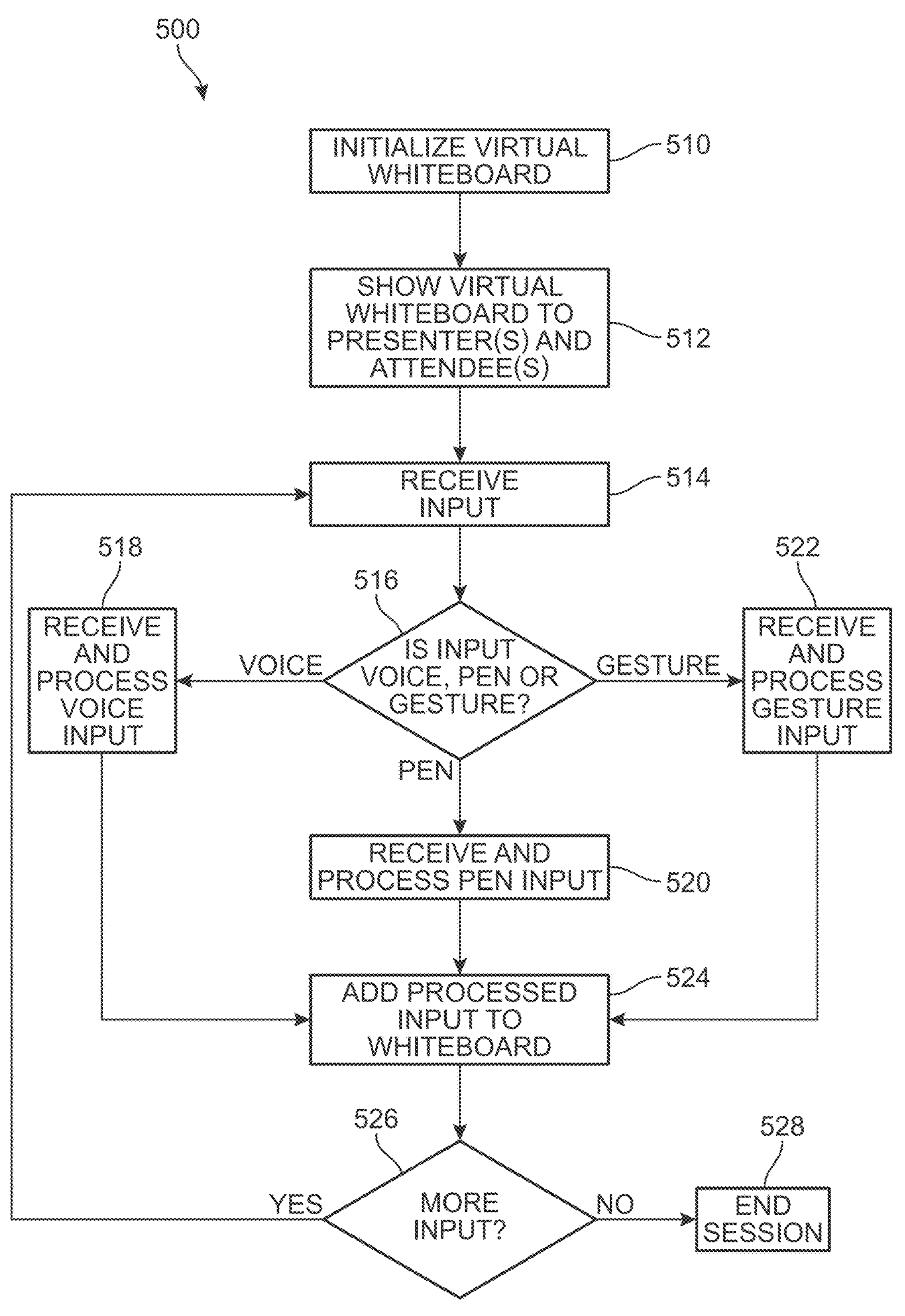
FIG. 5 is a flowchart showing how a virtual whiteboard receives and processes inputs, according to an embodiment.

FIG. 5 is a flowchart 500 showing how a virtual whiteboard receives and processes inputs, according to an embodiment. In step 510, the method initializes the virtual whiteboard. To initialize the virtual whiteboard, the method prepares graphics of a virtual whiteboard to present to users, such as a presenter 110 and an attendee 120. In some embodiments, there may be multiple presenters and attendees. In step 512, the method shows the virtual whiteboard to the presenter or presenters and the attendee or attendees. For example, if the XR environment is an AR environment, the method may show a virtual whiteboard overlaid over an actual environment that is visible to each user. If the XR environment is a VR environment, the method may create a virtual environment illustrating the virtual whiteboard without including the real (non-virtual) world.

Once the method presents the virtual whiteboard to the presenter and attendees, the method receives an input in step 514. Such an input may, for example, be a voice command, input using a pen as tracked by a mobile device or another controller, or an input using a gesture as tracked by a mobile device or another controller. In step 516, the method determines whether the input is a voice input, a pen input, or a gesture input. However, other types of input may be used in other embodiments. For example, a user may use a mobile device or another controller with buttons, and these buttons could also provide ways of providing input. If the input is a voice input, the method continues at step 518. If the input is a pen input, the method continues at step 520. If the input is a gesture input, the method continues at step 522.

At step 518, the method has established that the input is a voice input. Thus, in step 518, the method receives and processes a voice input. Additional details of such processing are presented in FIG. 6. Once the voice input is processed in step 518, the results of such processed voice input are added to the virtual whiteboard in step 524. Alternatively, if the input is a pen input, step 520 receives and processes the pen input. For example, handwriting recognition techniques may allow the user to write input on a tablet, or a tablet or another device may allow a user to select a control using a pen, a stylus, or a finger acting as a stylus. Once the pen input is processed in step 520, the results of such processed pen input are added to the virtual whiteboard in step 524.

At step 522, the method has established that the input is a gesture (which may be tracked using a mobile device, a controller, a motion detector, a touchscreen, or another form of gesture tracking, such as a combination of a camera and machine vision). In step 522, the method receives and processes a gesture. In step 524, the method modifies the virtual whiteboard based on the processed gesture. Thus, after each input is received in step 514, the type of input is determined in step 516 and the input is processed accordingly. By allowing for multiple types of input, it is easier for a presenter to provide certain types of instruction to attendees and it is easier for the attendees to respond appropriately.

For example, it may be convenient for a presenter to pose a question orally, such as the question posed in FIG. 4. However, it may be helpful to use a pen or another writing instrument such as a stylus when marking up an attendee's response. It may also be convenient for a presenter to use a gesture as input, which may allow the presenter to move around drawing elements on the virtual whiteboard. Such gesture input may be especially helpful when the virtual whiteboard includes multiple virtual sheets, and the gesture input can help the presenter flip pages, thereby selecting different pages. For example, as shown in FIGS. 1-3, one sheet may have a picture of a right triangle and another sheet may have a picture of the Pythagorean Theorem. By using gestures, a presenter could flip back and forth between the two virtual sheets, or could drag elements to incorporate both the triangle and the equation onto a single sheet.

Thus, combining voice, pen, and gesture input may facilitate using a virtual whiteboard as a medium for education. However, embodiments need not be limited to these types of input, and it is possible to incorporate other forms of input such as keyboard and mouse input, or other input devices such as a game controller or a remote control. In an embodiment, a user could enter a command as text, such as by using a keyboard or another means for entering text.

Figure 6:
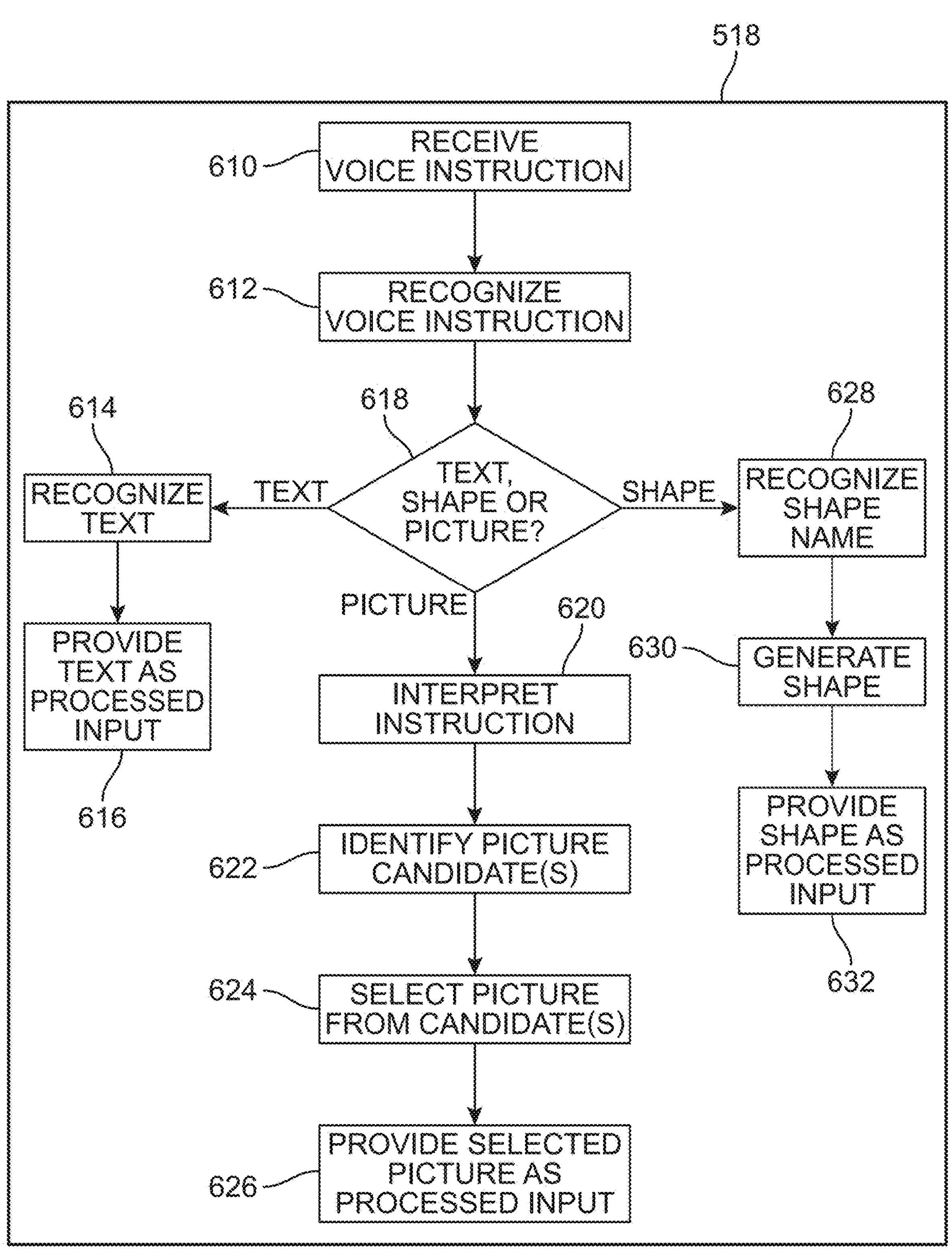
FIG. 6 is a flowchart showing greater details of how a virtual whiteboard receives and processes voice instructions, according to an embodiment.

FIG. 6 is a flowchart 600 showing greater details of how a virtual whiteboard receives and processes voice instructions, according to an embodiment. For example, the flowchart of FIG. 6 may correspond to step 518 of FIG. 5. In step 610, the method receives a voice instruction. The voice instruction may be a natural language instruction, or may be a voice instruction corresponding to a specific format or grammar. It is easier for a user to provide a natural language instruction, in that the user may provide a general description of what the user would like to add or modify on the virtual whiteboard. However, it can be more difficult for an embodiment to recognize natural language. In natural language, there are no constrains on what the user provides as inputs. If there is a specific format or grammar, it may help the system recognize a voice input or command because it will allow the system to match parts of the voice input or structure, such as by using a defined parse tree.

In step 612, the method recognizes the voice instruction. As an initial step the method uses voice recognition to convert the audio itself into text. Once the text is recognized, the method attempts to determine the meaning of the voice instruction. As noted, the voice instruction may be a natural language instruction. In this scenario, an embodiment may take the text that is the recognized version of the audio and determine a meaning associated with the text. Alternatively, step 612 may use natural language processing on the speech audio itself to identify an intended meaning of the instruction.

However, as noted above, the voice instruction may correspond to a specific format or grammar. For example, the system may expect a command followed by particular parameters based on the identity of the command. For example, a command may be "draw" and the parameters may specify what the system is to draw on the virtual whiteboard. For example, various such commands and their implementation are discussed further, such as in the discussion corresponding to FIGS. 11 and 12.

Step 612 assumes that the voice instruction is recognized. If not, the method returns to step 610. For example, the voice instruction may not include intelligible speech, or may consist of nonsense or a language that the system is not programmed to recognize. For example, if the voice instruction is "banana green hope" this does not lend itself to an interpretation that can usefully lead to depicting something on the virtual whiteboard. If the voice instruction is potentially executable, but is in a foreign language or needs clarification, the system could provide for a translation or a clarification. For example, if the user says "tracer un cercle" the system could recognize the command in French and translate the command into English and proceed accordingly (such as by drawing a circle). Alternatively, the system could indicate to the user that the system is designed to receive commands in English, and request that the user provide a new command in English.

Alternatively, the system may be able to detect that a command, once recognized, is a command corresponding to text, a shape, or a picture in step 618. If step 618 determines that the command corresponds to text, the recognition proceeds to step 614. If step 618 determines that the command corresponds to a picture, the recognition proceeds to step 620. If step 618 determines that the command corresponds to a shape, the recognition proceeds to step 628. In step 614, the method has established that the voice instruction is intended to write certain text on the virtual whiteboard. Thus, in step 614, the method recognizes the text. Once the text is recognized, the method continues by providing the text as the processed input in step 616. Thus, such text may be used to add to the virtual whiteboard in step 524.

Alternatively, the system may be able to detect that a command corresponds to a defined shape. For example, in step 628, the method recognizes the name of a shape. This shape could be a simple shape, such as a circle, a triangle, or a square. However, the shape could also be a more complicated shape. Then, in step 630, the method may recognize parameters for use in generating the shape. For example, in FIG. 1, the shape being drawn is a triangle. However, in step 630, the method may recognize that the triangle is a right triangle, and that its legs are 3 units and 4 units. As noted above, there may be defaults that specify aspects of how shapes are drawn, such as line colors and thicknesses, and so on.

Alternatively, the system may be able to detect that a command corresponds to a defined picture. For example, in step 620, the method may interpret the instruction (such as by using various NLP techniques) to help ascertain the picture that is to be drawn. In step 622, the method may identify picture candidates. Depending on the instruction, there may be one candidate or multiple candidates identified in step 622. In step 624, the method selects a specific picture to add to the virtual whiteboard from the candidates identified in step 622. Further details of how step 624 is performed are presented in FIG. 7.

Once the picture is selected in step 624, in step 626 the method provides the selected picture as the processed input to add to the virtual whiteboard. Thus, in step 524 of FIG. 5, FIG. 6 shows various ways to generate the corresponding processed input. For example, if the voice instruction corresponds to a text input, the processed text input will be provided by step 616, if the voice instruction corresponds to a picture, the processed picture input will be provided by step 626, and if the voice instruction corresponds to a shape input, the processed shape input will be provided by step 632.

Some embodiments may include provisions for receiving a voice instruction. In some embodiments, the voice instruction includes an instruction that immediately affects the public virtual whiteboard. In some cases, the voice instruction includes an instruction that initially affects a private virtual whiteboard and subsequently allows a user to affect a public virtual whiteboard. In some embodiments, the virtual whiteboard is used in an educational setting. In some cases, the virtual whiteboard receives input from a presenter.

A presenter may provide a voice instruction asking the virtual whiteboard to show information for the benefit of attendees. The presenter may also pose questions that one or more attendees can answer. In some embodiments, a presenter works one-on-one with an attendee. In some cases, the presenter works with several attendees. In some embodiments there may be multiple presenters. In some cases, there is not a specifically defined presenter/attendee role. There may be one or more presenters and one or more audience members. Alternatively, there may be one or more collaborators and all of the collaborators provide and consume information using the virtual whiteboard.

In some cases, the participants use voice commands as a primary means of interacting with the virtual whiteboard. Such voice commands are convenient ways to enter content into the virtual whiteboard. The voice commands can be recognized using voice recognition technologies. In some embodiments, the voice recognition transforms a voice command into a string of text that may be interpreted to draw a corresponding picture on the virtual whiteboard.

In some cases, the text may be used as the basis of an image search. The image search will identify appropriate candidate images, such as by identifying appropriate images on the Internet. In some embodiments, the text is transformed into a picture using Natural Language Processing (NLP). For example, the text may be interpreted using NLP. Once the text is interpreted, the text may be provided as a prompt to an Artificial Intelligence (AI) image generator. The image generator may generate images using the recognized text as a prompt. In some cases, the generated images are associated with confidence values. In some embodiments, the generated images are bitmapped images. In some cases, the generated images are vector images.

Figure 7:
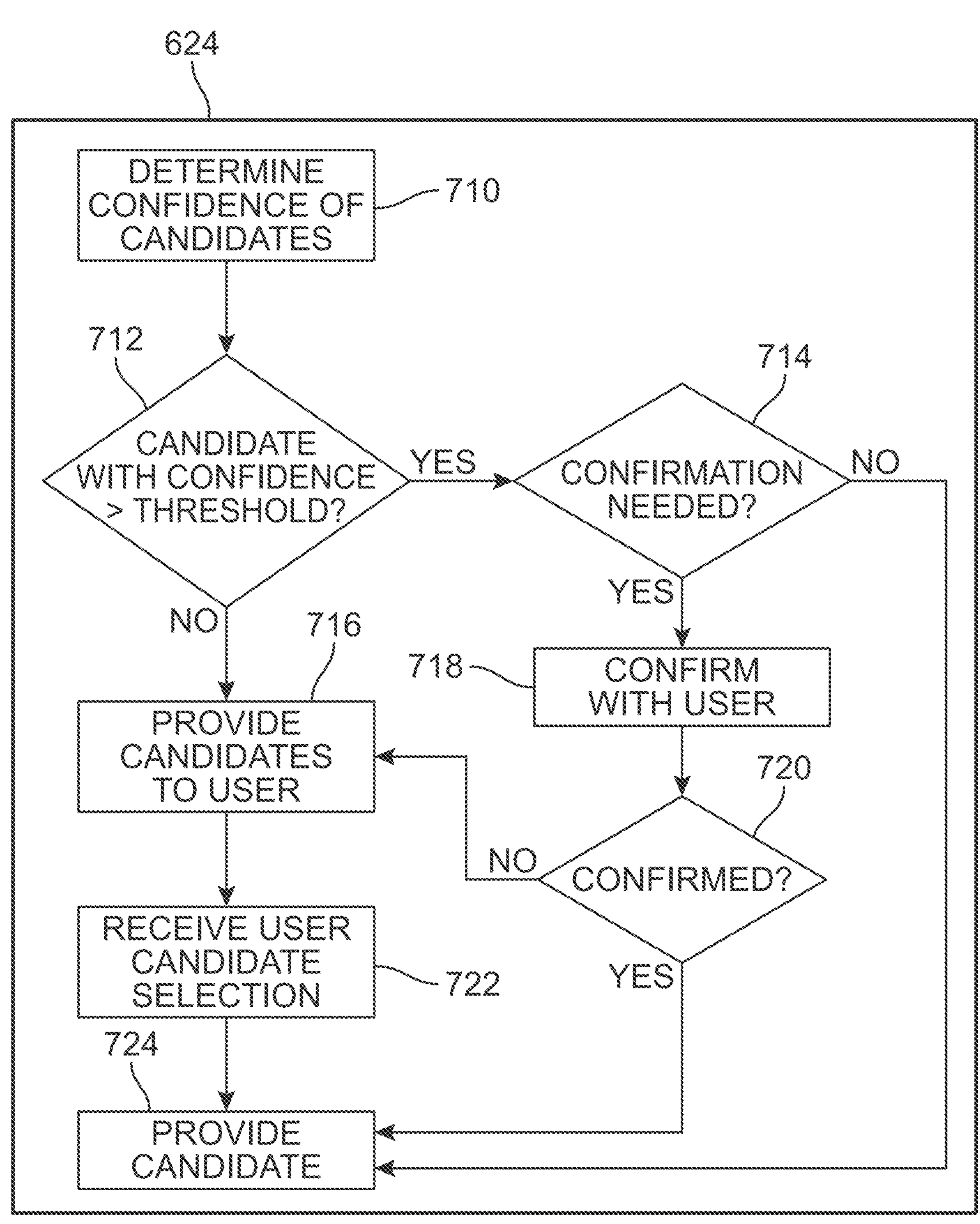
FIG. 7 is a flowchart showing how a virtual whiteboard manages uncertainty when processing voice instructions, according to an embodiment.

FIG. 7 is a flowchart showing how a virtual whiteboard manages uncertainty when processing voice instructions, according to an embodiment. For example, FIG. 7 shows a flowchart showing greater details of how step 624 of FIG. 6 is performed, in which a selected picture is chosen from the candidate picture or pictures identified in step 622 of FIG. 6, based on interpreting a voice instruction in step 620 of FIG. 6. For example, in step 710, the method determines a confidence of candidate pictures. Such a confidence is a measure of how suitable the picture is, based on the voice instruction.

For example, there may be a single candidate picture associated with a confidence, or multiple candidate pictures. In some cases, the confidence may be a numerical measure that provides a quantitative metric of how likely the picture is to be the picture that the user intends to have added to and displayed on the virtual whiteboard. As an example, the confidence may take on a value between 0 (no confidence) and 1 (complete confidence) or similarly between 0% (no confidence) and 100% (complete confidence).

In step 712, the method finds a candidate with a confidence greater than a threshold. For example, in step the method may consider the candidate with the greatest confidence score. If multiple candidates have the same confidence score, the method may proceed to step 716, which would allow the user to choose from multiple candidates. Alternatively, there may be other criteria that help establish the process by which the candidate is selected. For example, candidates obtained from certain sources may be preferred over others. However, if in step 712 a candidate exceeds the confidence threshold, it may be assumed that the candidate will be a good match to add to the virtual whiteboard, in accordance with the user's request to draw a given picture.

However, once the candidate has been determined in step 712 to exceed the confidence threshold, in step 714, a determination is made as to whether a confirmation is necessary for that picture to be approved by the user, of if it is simply possible to assume that the picture is the correct picture. For example, if a user has settings that the user wishes to assume that a highly confident picture is simply to be drawn, there may be no confirmation needed in step 714. In this scenario, the method may proceed to step 724, and provide the highly confidant picture as the candidate to be drawn. Alternatively, there may be a higher setting that acts as a threshold for selecting the candidate without confirmation. For example, if the confidence is greater than 0.9 (or 90%), the candidate may be selected without confirmation. However, if the confidence is between 0.8 and 0.9 (or between 80% and 90%), confirmation may be required.

Figure 9:
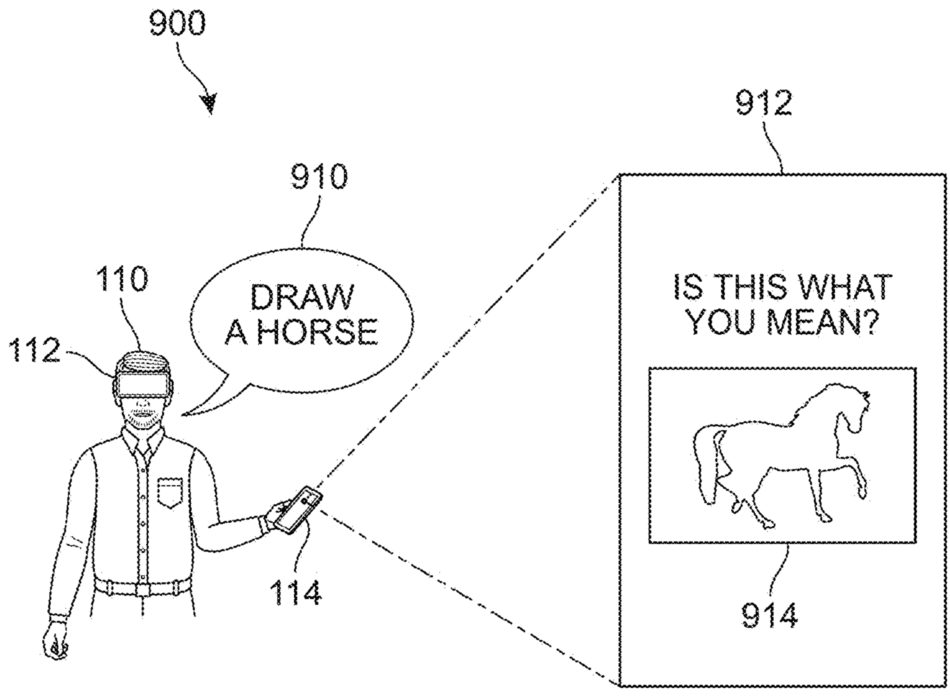
FIG. 9 is a schematic view showing how a presenter may provide an instruction to draw a picture and interact with a personal device to confirm a candidate picture, according to an embodiment.
Figure 9:
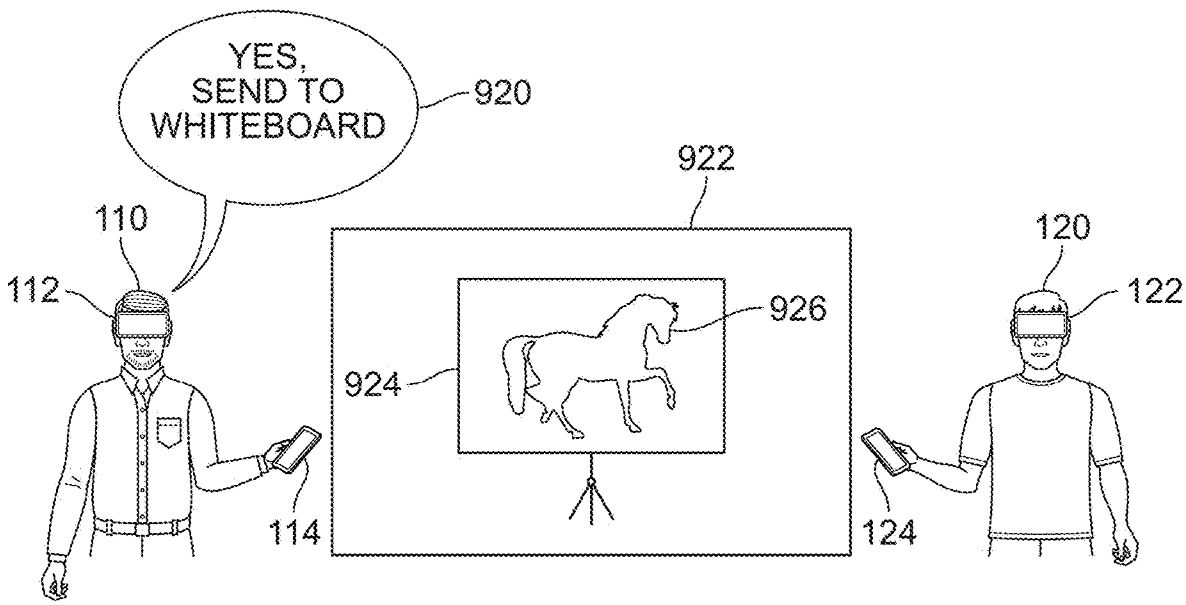

In a situation in which confirmation is required, the system performs a confirmation step in step 718. For example, the system may display the candidate picture to the user in step 718, such as at a local device, and the user can either confirm the image or indicate that the candidate image is incorrect. In step 720, the method proceeds based on the results of step 718. For example, if the result of step 720 is a determination that the picture is the correct picture, the method continues to step 724. Here, in step 724, the confident candidate is provided as the candidate for integration into the virtual whiteboard in step 724, which leads to the provision of the picture as input in step 626. An example of this approach is shown in FIG. 9, which is discussed further, below.

Figure 10:
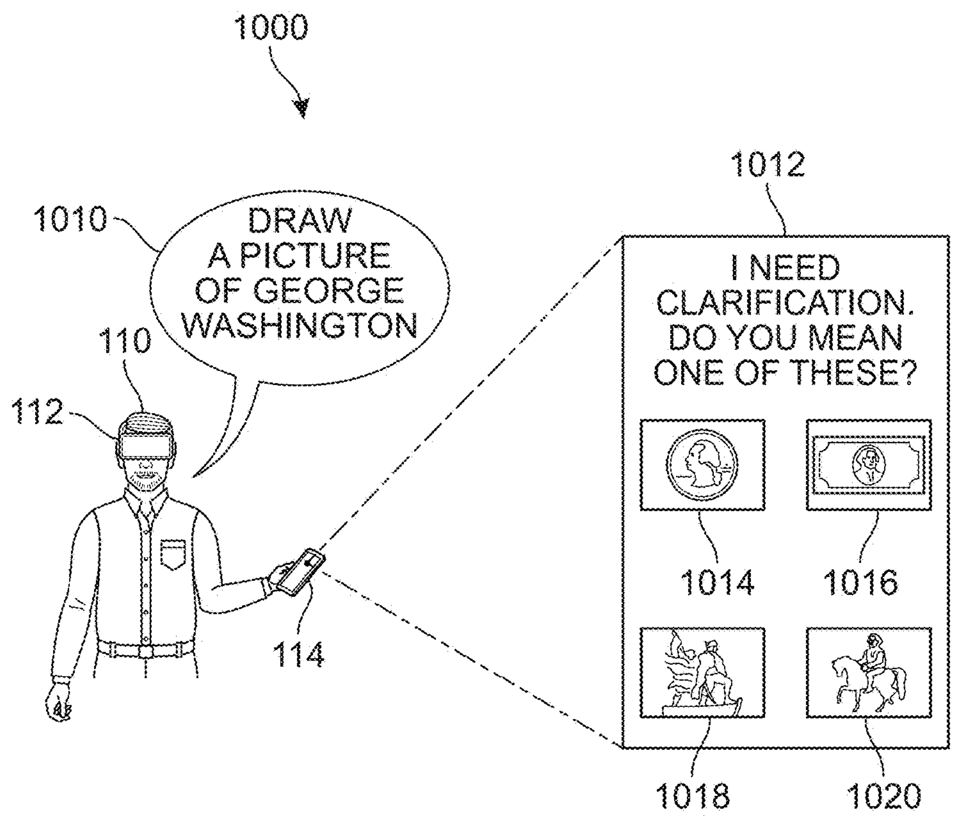
FIG. 10 is a schematic view showing how a presenter may provide an instruction to draw a picture and interact with a personal device to select a desired picture from candidate pictures, according to an embodiment.
Figure 10:
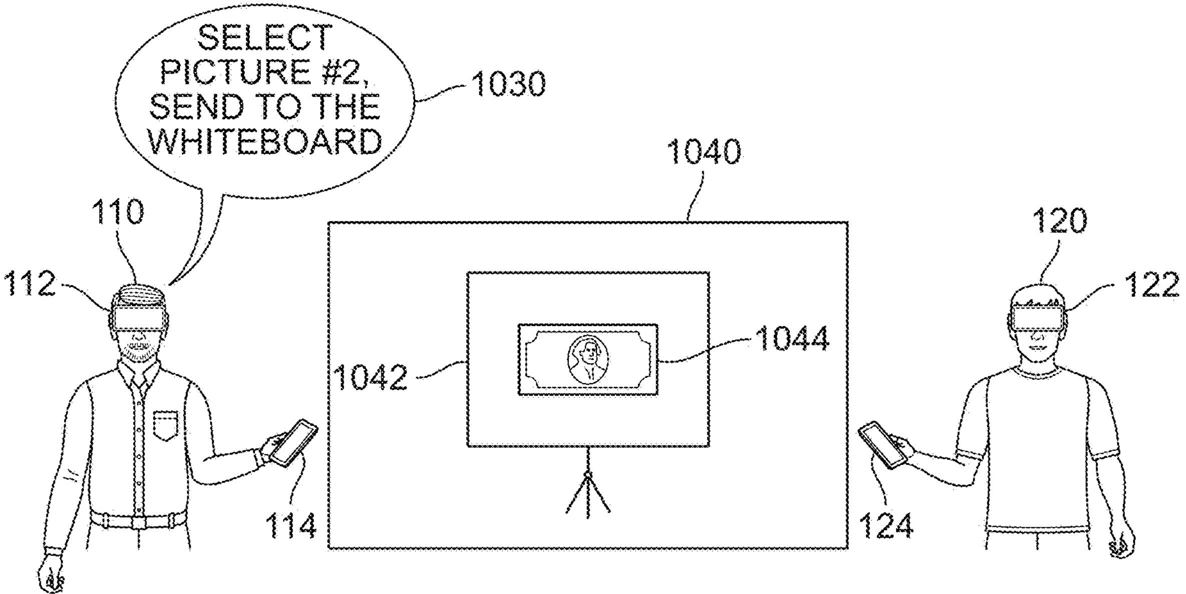

However, there may be multiple candidate pictures with similar confidence values. Thus, it is necessary to involve the user in such a situation so that the user is able to see the candidate pictures and then decide which of the candidates is the best choice. An example of the selection process is shown in FIG. 10, discussed further below. As shown in FIG. 7, where there are multiple candidate pictures, in step 716 the method provides the candidates to the user.

Then, in step 722, the method receives a user candidate selection. More specifically, the user chooses one of the candidate pictures, and then that picture is to be used as the candidate picture for being added to the virtual whiteboard. After the selection occurs in step 722, the candidate is actually provided in step 724. Step 724 thus provides a candidate picture, which is either a selected candidate picture or a candidate picture that was found with a confidence exceeding a threshold. If the candidate picture has such a confidence value, it may also have been specifically confirmed by the user.

Some embodiments may include provisions for receiving a voice instruction corresponding to a picture. In some embodiments, the voice instruction is interpreted to identify candidate pictures. In some cases, the candidate pictures are associated with confidences. These confidences may be determined as part of identifying the candidate pictures. The process that determines the candidate pictures may include determining confidences. Also, the candidate pictures may be determined as pictures having a greatest associated confidence.

In some embodiments, the confidences are determined separately from the picture generation process. In some cases, there is a threshold confidence that indicates that a picture with that confidence will be a good choice. In some embodiments, such a confident picture may be automatically selected. In some cases, the confident picture may be selected after confirmation by the user. In some embodiments, the confidence determines whether a confident picture requires confirmation. In some cases, there are multiple candidate pictures. These candidate pictures may include multiple candidate pictures that all exceed a certain threshold confidence. The candidate pictures may also include multiple candidate pictures that do not exceed a certain threshold confidence, if no candidates exceeding the threshold are available.

In some embodiments, the user may select a desired picture. In some cases, the user may provide a voice instruction to select the picture. In some embodiments, the user may provide another type of input, such as a touchscreen input, to select the picture. In some cases, the suggested pictures are insufficient. That is, in some cases, the user may not be content with any of the initially suggested pictures. The user may indicate this situation. In some embodiments, the system may simply use the existing query or prompts to generate additional candidates, with the hope that the user will prefer one of the additional candidates. In some cases, the user may elaborate on a query. The user may add or revise search terms or otherwise provide additional prompting to help improve the quality or relevance of the provided results.

Figure 8:
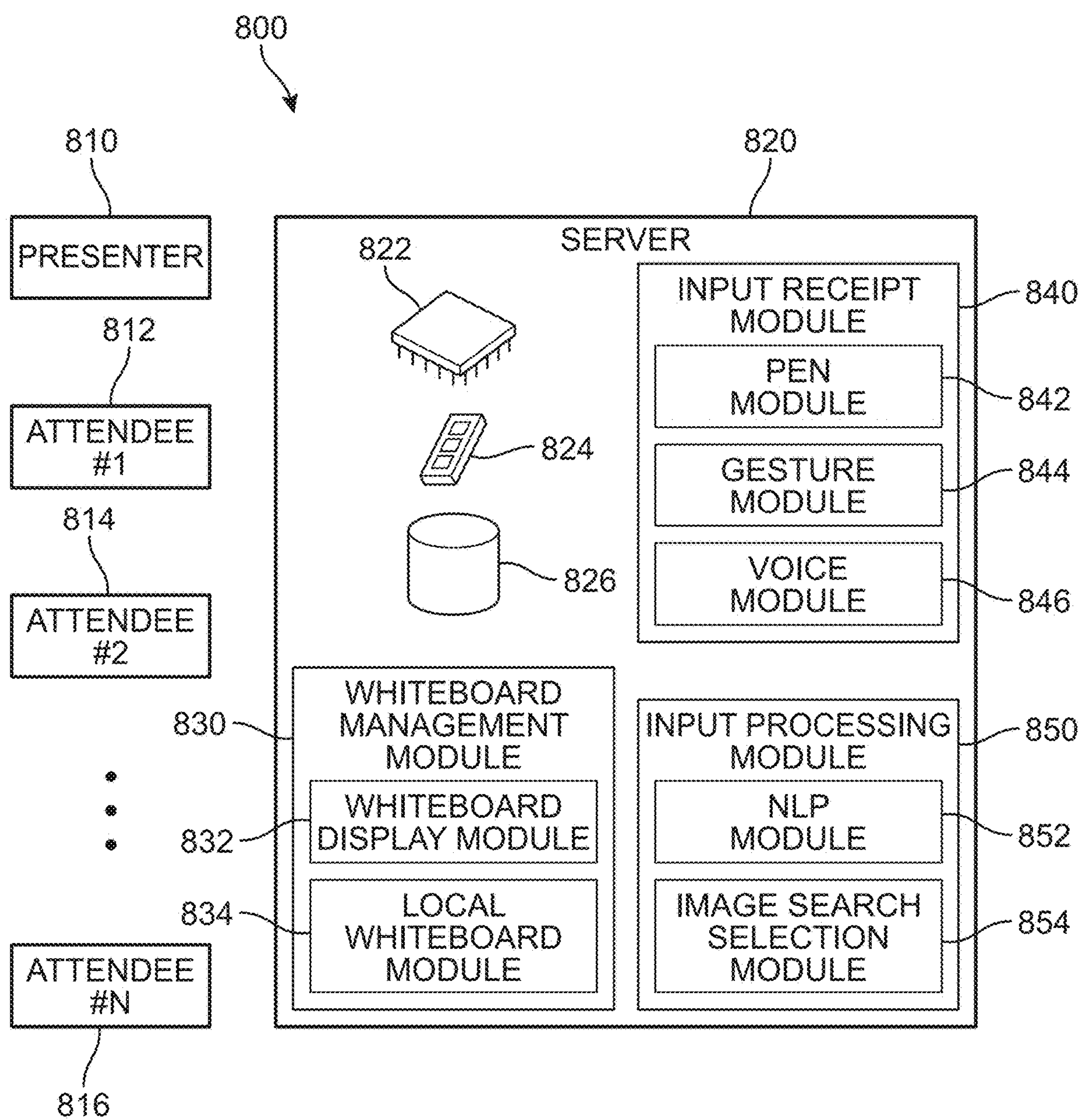
FIG. 8 is a schematic view of the structure of a system that provides a virtual whiteboard to facilitate interaction between a presenter and a group of attendees, according to an embodiment.

FIG. 8 is a schematic view of the structure of a system 800 that provides a virtual whiteboard to facilitate interaction between a presenter and a group of attendees, according to an embodiment. For example, the system may include a number of participants. FIG. 8 shows an example embodiment in which the participants include a presenter 810 and multiple attendees. For example, the attendees may include attendee #1 812, attendee #2 814, through attendee #N 816.

However, this is only an example of the participants. For example, there may also be more than one presenter, or there may be only one or two attendees. Alternatively, the participants may have a different role, and there may, instead of presenters and attendees, have a different communication relationship, such as a presenter and an audience, or the like. The participants may interact with a server 820, that hosts the virtual whiteboard.

The server 820 may include processor 822, memory 824, and storage 826. Processor 822 and memory 824 are illustrated as being connected to one another to share information. While processor 822 and memory 824 are each illustrated as being a single unit, processor 822 may include multiple processors or processors with multiple cores. Memory 824 may also take on different forms and may include multiple memory 824 elements. Memory 824 generally will include a working memory, such as Random-Access Memory (RAM). More persistent storage can occur through the use of storage 826.

Furthermore, the processor 822, the memory 824, and the storage 826 support the functioning of several modules that support the functioning of various features and operative components of embodiments. For example, server 820 may include a whiteboard management module 830. The whiteboard management module 830 manages displaying the virtual whiteboard to the various participants in a shared virtual environment. For example, the whiteboard management module 830 may include a whiteboard display module 832 and a local whiteboard module 834.

These modules coordinate display and editing of the information for the virtual whiteboard. More specifically, the whiteboard display module 832 provides virtual reality views of the virtual whiteboard to all (or some) of the participants, which may include the presenter 810 and the attendees, including attendee #1 812, attendee #2 814, and so on up to attendee #N 816). Thus, the whiteboard display module 832 manages public virtual views of the virtual whiteboard for display to the users. By contrast, local whiteboard module 834 displays a virtual whiteboard locally to a single user, such as at a local VR environment or at a local XR device.

The server 820 also includes an input receipt module 840. The input receipt module 840 processes inputs from the users that allow the users to contribute to the virtual whiteboard. For example, the input receipt module 840 may include a pen module 842, a gesture module 844, and a voice module 846. However, these modules are only examples. Some embodiments may include additional modules that manage receipt other types of inputs. The pen module 842 may allow a user to use a pen (or a similar related writing implement, such as a stylus or even a user's finger) to enter content, such as on a touchscreen. The gesture module 844 may allow a user to make a gesture that may be interpreted to manipulate the virtual whiteboard. For example, a gesture may allow a user to move content on the virtual whiteboard around the virtual whiteboard or may allow a user to reorder or reorganize whiteboard layers.

The voice module 846 may allow a user to enter content using voice input. Several examples of such voice inputs have already been presented, and other examples are provided, below. In general, the voice module 846 receives audible input from a user, recognizes words in the audible input, and determines appropriate content to add to the virtual whiteboard based on the recognized words.

The input from the voice module 846 may additionally be processed in another portion of server 820, specifically input processing module 850. Input processing module 850 interprets the result of input receipt module 840. If the input from input receipt module 840 is pen input or gesture input, the input processing module 850 interprets the input appropriately and sends the interpreted input to whiteboard management module 830 for display. Input processing module 850 may also include a Natural Language Processing (NLP) module 852 and an image search selection module 854. NLP module 852 analyzes the output of voice module 846.

After an audio input has been received at voice module 846, the voice module has performed speech recognition on the audio input. The NLP module 852 uses natural language techniques to interpret the meaning of the audio input. For example, the NLP module 852 may use a large language model to take the audio input and produce a corresponding picture. As an additional component, input processing module 850 may include an image search selection module 854. The image search selection module 854 uses the audio input as a search query to search for corresponding images, such as by searching using an image search engine on the Internet. The images retrieved by NLP module 852 or image search selection module 854 may be associated with confidence scores indicating a metric of how responsive to the audio query a given candidate image is. Such confidence scores may be used as a part of selecting an image to add to the virtual whiteboard, as shown in FIG. 7.

FIG. 9 is a schematic view 900 showing how a presenter may provide an instruction to draw a picture and interact with a personal device to confirm a candidate picture, according to an embodiment. For example, FIG. 9 shows a presenter 110 along with the presenter's XR headset 112 and the mobile device 114. In the first portion of FIG. 9, presenter 110 says the audio command 910, namely "Draw a Horse." The audio command is recognized using speech recognition, such as by voice module 846, and the input processing module 850 is then able to identify the words in the audio command 910, specifically "Draw a Horse."

The input processing module 850 may then interpret the command. For example, the input processing module 850 may use an NLP module 852 to understand that the user wishes to "Draw" as their action, implying that the rest of the command is an instruction as to what to draw. The NLP module 852 may also realize that "a" is an article that will be followed by the identify of what the presenter 110 wants to draw. Finally, the NLP module 852 may realize that the user intends to draw a "horse."

The NLP module 852 may then attempt to use its knowledge (such as from a large language model) to produce an image that is exemplary of a "horse." For example, the mobile device 114 may display on a local display 912 the sentence "Is This What You Mean?" as a prompt to allow the presenter 110 to confirm that the proposed image of a horse 914 is the desired image. For example, in FIG. 9, the horse image 914 may exceed a confidence threshold and thus may be proposed as the sole image candidate for the approval of presenter 110.

Once the local display 912 has shown the candidate horse image 914 to the presenter 110, the presenter 110 may then say "Yes, Send to Whiteboard" in audio command 920. This audio command 920 causes the public whiteboard 924 in the virtual environment 922 to be updated to display a horse 926. The horse 926 includes the horse image 914 that was confirmed by presenter 110. The public whiteboard 924 is also visible to attendee 120, through the XR headset 122 of the attendee 120. The attendee 120 may also hold an appropriate mobile device 124 to allow the attendee to interact with the public whiteboard 924 in the virtual environment 922. Thus, FIG. 9 shows an example 900 in which a user requests and image, the system identifies a candidate image with a high confidence, confirms the image, and then adds the image to the public whiteboard 924 after the image has been approved.

FIG. 10 is a schematic view 1000 showing how a presenter may provide an instruction to draw a picture and interact with a personal device to select a desired picture from candidate pictures, according to an embodiment. For example, FIG. 10 again illustrates presenter 110 with an XR headset 112 and a mobile device 114. Here, the audio command 1010 is "Draw a Picture of George Washington."

However, this audio command 1010 may be somewhat less clear than other commands. That is, when the audio command 1010 is matched with candidate images, the individual images may not be sufficiently confident. Alternatively, there may be multiple images with high confidence, and it may be desirable to have user inputs that can help discriminate between these multiple candidate images.

For example, when a user wishes to draw a picture of George Washington, that could mean several things. Most likely, the user wishes to draw a picture of the U.S. president George Washington. Thus, the display 1012 shows the prompt, "I Need Clarification. Do You Mean One of These?" The prompt is meant to instruct the user to choose from one of a variety of candidate images, including a picture #1 1014 of George Washington on a quarter coin, a picture #2 1016 of George Washington on a $1 bill, a picture #3 1018 of George Washington crossing the Delaware River, and a picture #4 1020 of George Washington riding on a horse.

The user may decide that the picture #2 1016 of George Washington on a $1 bill is the picture that the user wishes to use. For example, the presenter 110 could say audio command 1030 and say, "Select Picture #2, Send to the Whiteboard." In response to audio command 1030, the virtual environment 1040 displays, on virtual whiteboard 1042, a picture 1044 of George Washington on a $1 bill. Because the virtual whiteboard 1042 is a part of the virtual environment 1040 (which is public), the attendee 120 can see the virtual environment 1040 through an XR headset 122. The attendee 120 can also interact with the virtual environment 1040 using a mobile device 124.

However, it may also be possible that presenter 110 is not happy with any of the candidate pictures displayed on display 1012. In such a situation, the presenter 110 may request additional candidates. As an alternative, the presenter 110 may expand upon or clarify the query 1010. For example, the user may say "Draw a Picture of George Washington on Currency" and this would help narrow down the query 1010 to picture #1 1014 and picture #2 1016, as well as other pictures of currency, such as quarters and $1 bills.

Alternatively, the presenter 110 may wish to clarify the query 1010. Based on the original query, it would be reasonable to assume that the presenter 110 wants a picture of the U.S. president George Washington. However, the presenter 110 may clarify that the query should be "Draw a Picture of George Washington University" or "Draw a Picture of George Washington Carver." Based on these examples, the NLP module 852 or the image search selection module 854 may realize that, instead of a picture of a president, the user's intention would be to draw a picture of an educational institution or a scientist.

Figure 11:
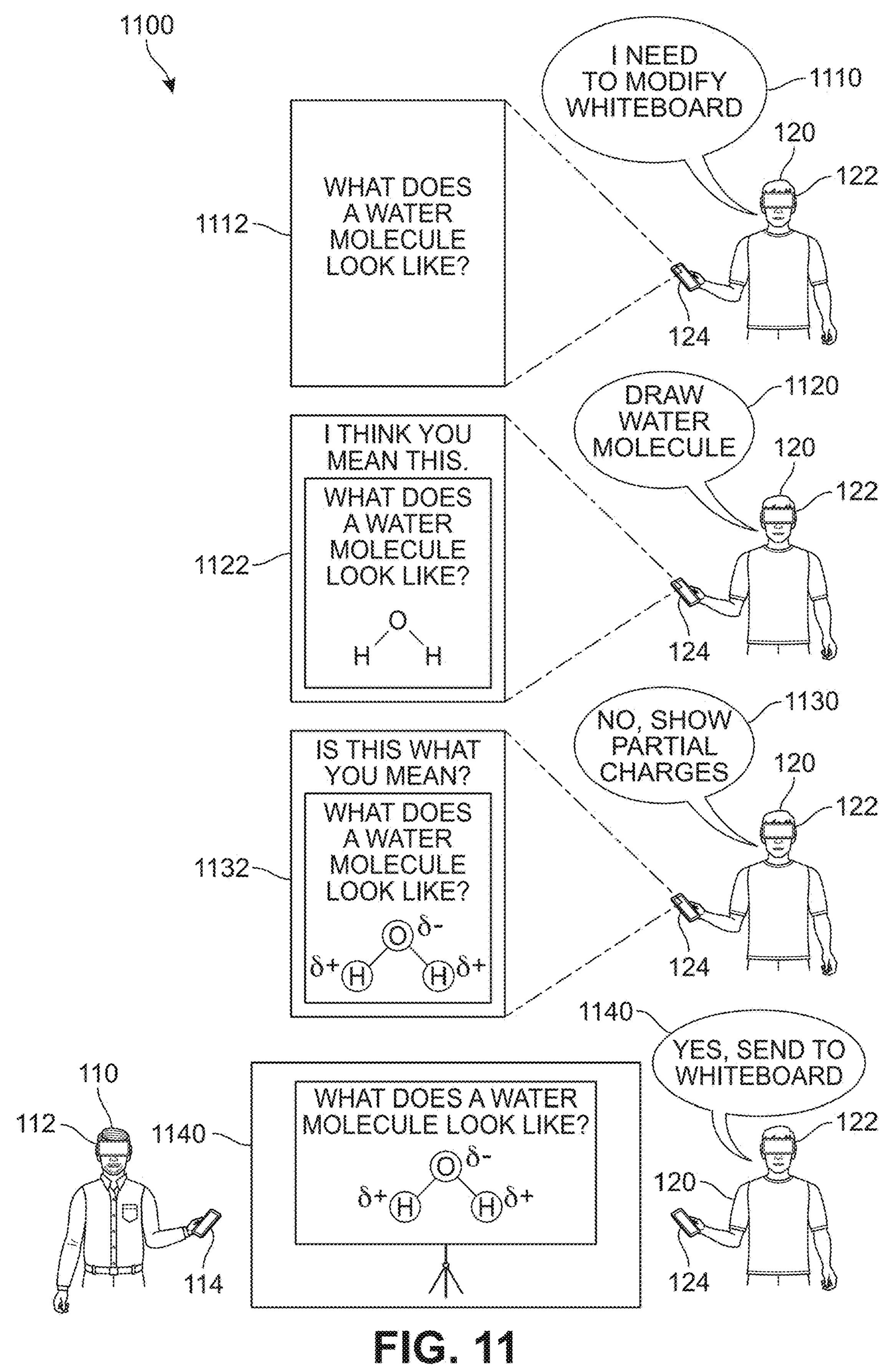
FIG. 11 is a schematic view of an attendee interacting with a presenter with respect to a chemistry question, according to an embodiment.

FIG. 11 is a schematic view 1100 of an attendee interacting with a presenter with respect to a chemistry question, according to an embodiment. The attendee 120 has an XR headset 122 and a mobile device 124, as discussed further above. The attendee 120 initially sees, on the mobile device 124 display, a question 1112 posed by presenter 110, where the question 1112 is "What Does a Water Molecule Look Like?" Thus, in response, the attendee 120 instructs the system "I Need to Modify Whiteboard."

This instruction 1110 causes the system to realize that the attendee 120 would like to prepare an answer to the question 1112. Thus, the attendee 120 then provides the next oral instruction 1120, which is "Draw Water Molecule." In response to oral instruction 1120, the system provides initial result 1122. In initial result 1122, the system displays "I Think You Mean This" to indicate that it has prepared a preliminary candidate for the approval of attendee 120 as what a water molecule looks like.

Also in initial result 1122, the initial result 1122 shows that the draft of the virtual whiteboard would still include the original question "What Does a Water Molecule Look Like?" and also an initial drawing of a water molecule. However, the initial drawing of the water molecule only shows an oxygen atom and two hydrogen atoms attached to the oxygen atom. Thus, attendee 120 issues instruction 1130, in which the attendee 120 asks the system, "No. Show Partial Charges."

In response to instruction 1130, the system presents updated result 1132. In updated result 1132, the system displays "Is This What You Mean?" to determine if the attendee would like to proceed with updated result 1132. Updated result 1132 shows "What Does a Water Molecule Look Like?" and also an updated drawing of a water molecule. The updated drawing of the water molecule presented in updated result 1132 includes circles around the atoms in the water molecule. Moreover, the updated drawing of the water molecule shows partial charges for the water molecule, specifically a negative delta for the oxygen atom (denoted O) and a positive delta for the hydrogen atoms (each denoted H).

Because the updated drawing of the water molecule at updated result 1132 includes the contents the attendee 120 wants, the attendee 120 may issue the instruction 1140 "Yes, Send to Whiteboard." The instruction 1140 causes the system to display the updated result 1132 in virtual environment 1142 on virtual whiteboard 1144. Thus, on virtual whiteboard 1144, the system displays not only the prompt from presenter 110, but also the drawing of the water molecule identified by attendee 120 through local interactions.

In particular, the interaction with the attendee 120 ensures that the drawn molecule includes partial charges, which may be a preference of the presenter 110 that the attendee 120 would like to keep in mind when answering the presenter's question. Thus, once attendee 120 has added the updated result 1132 to the virtual whiteboard 1144, it may be visible to presenter 110 through XR headset 112. The presenter 110 may be able to confirm that the attendee 120 is correct, or ask a follow-up question, and so on.

Figure 12:
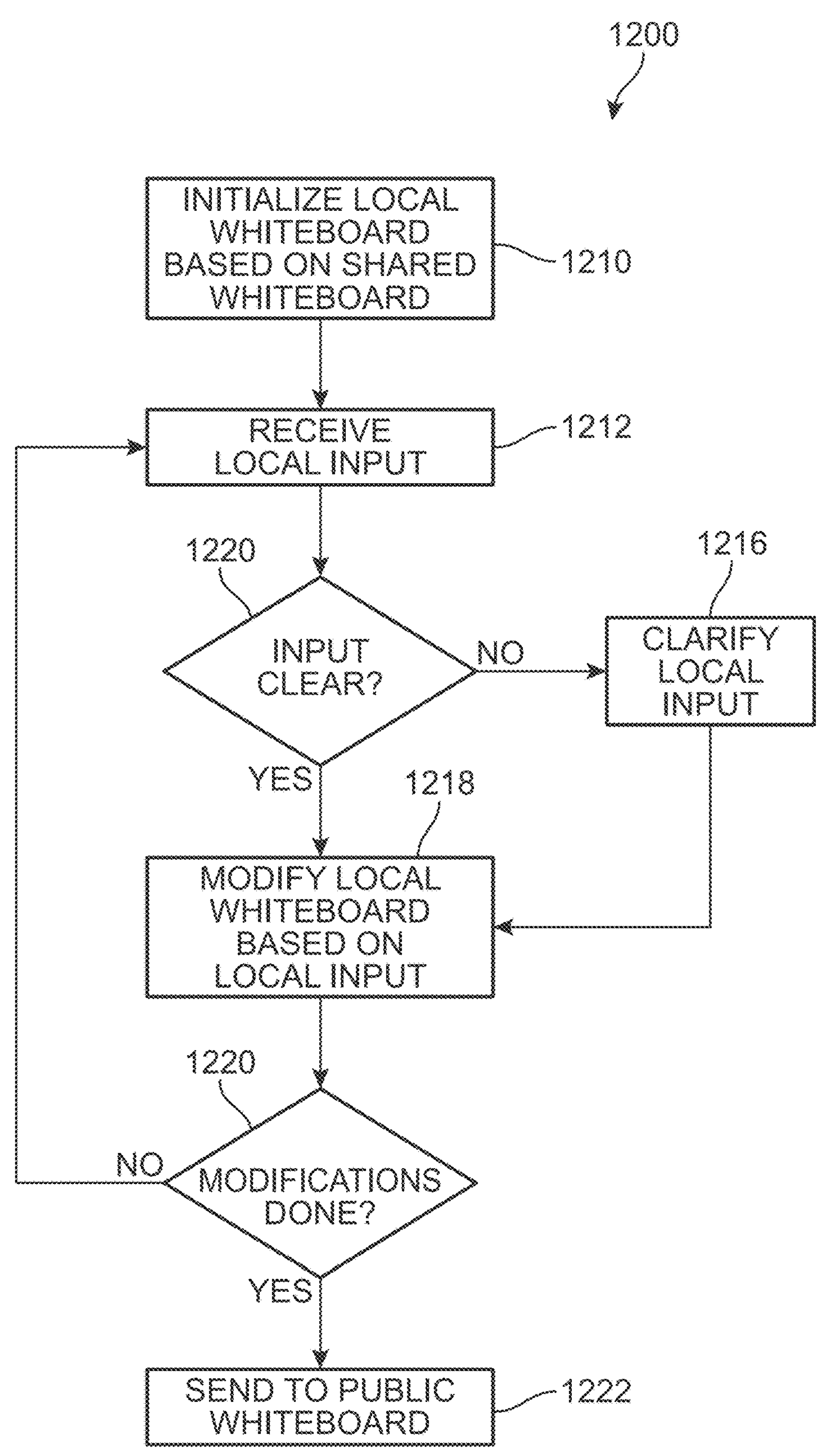
FIG. 12 is a flowchart showing preparation of contents of a local virtual whiteboard before sending the contents to a public virtual whiteboard, according to an embodiment.

FIG. 12 is a flowchart 1200 showing preparation of contents of a local virtual whiteboard before sending the contents to a public virtual whiteboard, according to an embodiment. In step 1210, the method initializes the local whiteboard based on the shared whiteboard. For example, a user's local device may provide the user with access to a private view of the virtual whiteboard that allows the user to focus on getting an addition to the virtual whiteboard fully ready locally before it is added to the shared whiteboard.

Once the virtual whiteboard is initialized in step 1210, the method continues in step 1212, in which the system receives a local input. For example, as discussed above, the input may be a voice input, a pen input, or a gesture input. Once the input is received in step 1212, the method determines at step 1214 whether the input is clear or not. This determination may include a determination of whether the input is ambiguous.

For example, FIG. 10 shows a situation where "George Washington" is unclear and may be interpreted in several ways. Thus, the method would continue with step 1216 to clarify the local input by determining which of the alternatives is relevant. Step 1216 could also prompt the user to enter new input if the instruction is nonsensical or otherwise completely unable to be interpreted as a way to modify the virtual whiteboard. Thus, either step 1214 will confirm that the input is clear and proceed directly to step 1218, or will proceed to step 1216, which will clarify the local input and then proceed to step 1218.

In step 1218, the method modifies the local whiteboard based on the local input. For example, if the local input is an instruction to draw a horse as shown in FIG. 9, the method adds the horse to the local input. Next, in step 1220, the method confirms that the modifications are done. For example, the method may wait for the user to instruct the system to send the local input to the shared whiteboard, or may ask the user if the user is done with adding content locally. This approach provides the user with the opportunity to keep modifying content locally until the user is happy with the final version of content to be added to the shared whiteboard. For example, FIG. 11 shows that the attendee 120 may wish to make modifications before the attendee 120 is fully ready to have their answer to the question posed be added in the shared whiteboard. Thus, when step 1220 determines that the modifications are complete, the method concludes by sending the local content to the shared whiteboard in step 1222.

Some embodiments may include provisions for displaying a virtual whiteboard. In some embodiments, these provisions display a virtual whiteboard publicly to a number of collaborators. In some cases, the collaborators may view the virtual whiteboard using extended reality (XR) equipment such as an XR headset.

In some embodiments, the collaborators request changes and the changes are reflected publicly immediately. In some cases, the collaborators make changes privately before the changes are reflected on the public whiteboard. In some embodiments, the collaborators make changes privately using a local device. In some cases, the collaborators make changes privately using a version of the virtual whiteboard that only they see. In some embodiments, the private version is edited using a device of the editing users. The device may be a mobile device such as a smartphone, a phablet, or a tablet. However, these are non-limiting examples, and other devices may be used to manage the local editing process.

In some cases, the private version is edited using a version of the virtual whiteboard that is only visible from an individual user's XR headset. In some embodiments, the private whiteboard requests edits from the user locally. In some cases, the private whiteboard receives such inputs. The inputs may include voice, gesture, and pen inputs. In some embodiments, the voice inputs are interpreted as corresponding to a text or to a shape.

In some cases, the voice inputs are interpreted as suggesting a picture. In some embodiments, the picture is identified using an image search. In some cases, the picture is identified using Natural Language Processing (NLP) and an associated Artificial Intelligence (AI) model. In some embodiments, the picture is identified as being a choice from several candidate pictures. In some cases, there may be a clear favorite of which picture to use. In some embodiments, the local selection may involve clarifying which picture to use. In some cases, the clarifying may involve confirming a candidate, either a front-runner or a choice. In some embodiments, the local editing may involve multiple edits.

In some cases, the local editing may be continued until the receipt of an indication that there has been enough local edition. That is, the local editing may continue until the author private content confirms that the local editing is complete. In some embodiments, the local editing being complete means that the local whiteboard is ready for public display. In some cases, the user system receives a voice command or another instruction indicating that the local whiteboard is ready and its contents should be displayed on the public whiteboard.

Thus, the present embodiments provide a number of advantageous features. The embodiments provide a flexible way for users to interact and share content in a virtual environment, such as an educational environment. For example, a presenter may pose a question to attendees, who may then interact with the presenter to facilitate a learning process through the use of a virtual whiteboard. The embodiments allow for the use of multiple layers of virtual whiteboards to facilitate the information interchange.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. Examples of media that can be used for storage include erasable programmable read-only memory (EPROM), electrically erasable programmable read-only memories (EEPROM), solid state drives, magnetic disks or tapes, optical disks, CD ROM disks and DVD-ROM disks.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

For each of the exemplary processes described above including multiple steps, it may be understood that other embodiments some steps may be omitted and/or reordered. In some other embodiments, additional steps could also be possible.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A method of communicating using a virtual whiteboard, comprising:

displaying the virtual whiteboard to a group of participants;

receiving a voice input from a particular participant from the group of participants;

processing the voice input to generate content to add to the virtual whiteboard;

generating an updated virtual whiteboard by adding the content to the virtual whiteboard; and displaying the updated virtual whiteboard to the group of participants;

wherein the voice input from the particular participant is a voice input corresponding to text defining a picture input and the method further comprises using at least one of an image search, natural language processing, and an artificial intelligence image generation model to generate at least one candidate picture corresponding to the text.

2. The method of claim 1, wherein the group of participants each view the virtual whiteboard using an extended reality headset.

3. The method of claim 1, wherein the voice input from the particular participant corresponds to an instruction to add one of text, a shape, and a picture to the virtual whiteboard and is processed accordingly to generate corresponding content.

4. The method of claim 1, wherein the at least one candidate picture comprises a preferred candidate picture associated with a confidence value greater than a threshold confidence value and the preferred candidate picture is automatically selected as the content to be added to the virtual whiteboard.

5. The method of claim 1, wherein the at least one candidate picture is displayed to the particular participant and the particular participant selects a picture from the at least one candidate picture as the content to be added to the virtual whiteboard.

6. The method of claim 1, further comprising:

receiving an instruction that an additional modification to the virtual whiteboard is desired by the particular participant; and updating the virtual whiteboard further based on receiving and processing an additional voice input from the particular participant.

7. A method of communicating using a virtual whiteboard, comprising:

showing the virtual whiteboard privately to a particular participant from a group of participants for private editing;

receiving a voice input from the particular participant;

determining a text command corresponding to the voice input, using speech recognition;

processing the text command to produce generated candidate content to add to the virtual whiteboard;

updating the virtual whiteboard locally based on a selection of the generated candidate content from the particular participant;

receiving an indication from the particular participant that the private editing is complete; and providing the updated virtual whiteboard for public viewing;

wherein the generated candidate content includes a plurality of candidate images associated with respective confidence values and the generated candidate content is selected based on the respective confidence values.

8. The method of claim 7, wherein the generated candidate content is produced using an image search based on the text command.

9. The method of claim 7, wherein the generated candidate content is produced using natural language processing to determine a meaning of the text command.

10. The method of claim 7, wherein the generated candidate content is produced using the text command as a prompt to generate candidate images using an artificial intelligence image generation algorithm.

11. The method of claim 7, further comprising:

receiving an indication that an additional modification to the virtual whiteboard is desired by the particular participant; and updating the virtual whiteboard further based on receiving and processing an additional voice input from the particular participant.

12. A system for communicating using a virtual whiteboard, comprising:

at least one processor, configured to:

show the virtual whiteboard for private editing to a particular participant from a group of participants;

receive a voice input from the particular participant;

recognize natural language content corresponding to the voice input;

process the natural language content to produce generated candidate content to add to the virtual whiteboard;

update the virtual whiteboard locally based on a selection of the generated candidate content from the particular participant;

receive an indication that the private editing is complete; and add the generated candidate content to the virtual whiteboard for public viewing;

wherein the voice input from the particular participant is a voice input corresponding to text defining a picture input and the method further comprises using at least one of an image search, natural language processing, and an artificial intelligence image generation model to generate at least one candidate picture corresponding to the text.

13. The system of claim 12, wherein the generated candidate content is produced using an image search based on the natural language content.

14. The system of claim 12, wherein the generated candidate content is produced using natural language processing to determine a meaning of the natural language content.

15. The system of claim 12, wherein the generated candidate content is produced using the natural language content to generate candidate images using an artificial intelligence image generation algorithm.

16. The system of claim 12, wherein the particular participant provides additional instructions and the generated candidate content is regenerated based on the additional instructions.

17. The system of claim 12, wherein the particular participant provides additional instructions and the generated candidate content is supplemented based on the additional instructions.

* * * * *